US010861265B1

United States Patent
Merkley et al.

(10) Patent No.: US 10,861,265 B1
(45) Date of Patent: Dec. 8, 2020

(54) AUTOMATED DOOR LOCK

(71) Applicant: Vivint, Inc., Provo, UT (US)

(72) Inventors: Logan Sanders Merkley, American Fork, UT (US); Janelle Kim Seegmiller, Seattle, WA (US); Spencer J. Nugent, American Fork, UT (US); Michael D. Child, Draper, UT (US); Tanner H. Potter, Orem, UT (US)

(73) Assignee: Vivint, Inc., Provo, UT (US)

( * ) Notice: Subject to any disclaimer, the term of this patent is extended or adjusted under 35 U.S.C. 154(b) by 0 days.

(21) Appl. No.: 15/877,180

(22) Filed: Jan. 22, 2018

Related U.S. Application Data

(60) Provisional application No. 62/449,564, filed on Jan. 23, 2017.

(51) Int. Cl.
*G07C 9/00* (2020.01)
*G06K 9/00* (2006.01)
*G06K 9/62* (2006.01)
*G06K 9/78* (2006.01)
*H04N 7/18* (2006.01)
*G06Q 10/08* (2012.01)
*G06F 16/783* (2019.01)

(52) U.S. Cl.
CPC ..... *G07C 9/00563* (2013.01); *G06K 9/00771* (2013.01); *G06K 9/6202* (2013.01); *G06K 9/78* (2013.01); *G07C 9/00896* (2013.01); *H04N 7/186* (2013.01); *G06F 16/784* (2019.01); *G06Q 10/083* (2013.01); *G07C 2009/0092* (2013.01)

(58) Field of Classification Search
CPC ............ G07C 9/00563; G07C 9/00896; G07C 2009/0092; H04N 7/186; G06K 9/78; G06K 9/6202; G06K 9/00771; G06F 16/784; G06F 17/30793; G06Q 10/083
See application file for complete search history.

(56) References Cited

U.S. PATENT DOCUMENTS

| | | | |
|---|---|---|---|
| 2004/0254802 A1* | 12/2004 | Miller | G07F 17/12 705/337 |
| 2008/0121682 A1* | 5/2008 | Grim | A47G 29/141 232/1 R |
| 2013/0304347 A1* | 11/2013 | Davidson | G06Q 10/083 701/99 |
| 2013/0304348 A1* | 11/2013 | Davidson | G06Q 10/083 701/99 |
| 2013/0304349 A1* | 11/2013 | Davidson | G08G 1/0112 701/99 |
| 2015/0199857 A1* | 7/2015 | Mackin | G07C 9/00896 340/5.26 |
| 2015/0235493 A1* | 8/2015 | Hall | G07C 9/00896 340/5.71 |
| 2015/0235495 A1* | 8/2015 | Hall | G07C 9/00896 340/5.51 |
| 2015/0248795 A1* | 9/2015 | Davidson | G01C 21/34 701/1 |
| 2015/0363843 A1* | 12/2015 | Loppatto | G06Q 30/0283 705/330 |

(Continued)

*Primary Examiner* — Howard D Brown, Jr.
(74) *Attorney, Agent, or Firm* — Holland & Hart, LLP

(57) ABSTRACT

Techniques are described for a security and automation system. One method includes receiving sensor data associated with at least one sensor of the security and automation system; analyzing the received sensor data; and initiating a function of the security and automation system based on the analyzing.

20 Claims, 18 Drawing Sheets

(56) References Cited

U.S. PATENT DOCUMENTS

| | | | |
|---|---|---|---|
| 2015/0371468 A1* | 12/2015 | Mackin | G07F 17/12 340/5.26 |
| 2016/0247344 A1* | 8/2016 | Eichenblatt | H04N 7/183 |
| 2017/0147975 A1* | 5/2017 | Natarajan | B64F 1/00 |
| 2017/0236088 A1* | 8/2017 | Rao | G06Q 10/10 705/7.17 |
| 2018/0029760 A1* | 2/2018 | Maser | B65D 43/16 |
| 2018/0046964 A1* | 2/2018 | Leoni | G06Q 10/083 |
| 2018/0060800 A1* | 3/2018 | Robinson | G07C 9/00912 |
| 2019/0057350 A1* | 2/2019 | Simms | G06Q 10/0836 |
| 2019/0130342 A1* | 5/2019 | Maheshwari | H04W 4/024 |

* cited by examiner

AUTOMATED DOOR LOCK

CROSS REFERENCES

The present application for patent claims priority to U.S. Provisional Patent Application No. 62/449,564, entitled, "Automated Door Lock," filed Jan. 23, 2017. The disclosure of which is incorporated by reference herein in its entirety.

BACKGROUND

The present disclosure, for example, relates to security and automation systems, and more particularly to automated door locks.

Security and automation systems are widely deployed to provide various types of communication and functional features such as monitoring, communication, notification, and/or others. These systems may be capable of supporting communication with a user through a communication connection or a system management action.

Present security and automation systems, e.g., for homes and commercial businesses, have become commonplace as people seek to guard themselves and their property. These systems typically employ sensors at entry and exit points, along with interior sensors (e.g., motion detectors, sound sensors, and glass break sensors) for determining entry or exit into or out of a property.

SUMMARY

A method for security and automation system is described. The method may include receiving sensor data associated with at least one sensor of the security and automation system; analyzing the received sensor data; and initiating a function of the security and automation system based at least in part on the analyzing.

An apparatus for reducing false alarms of a security and automation system is described. The apparatus may include a processor, memory in electronic communication with the processor, and instructions stored in the memory. The instructions may cause the processor to receive sensor data associated with at least one sensor of the security and automation system; analyze the received sensor data; and initiate a function of the security and automation system based at least in part on the analysis.

A non-transitory computer readable medium for reducing false alarms of a security and automation system is described. The non-transitory computer readable medium may store a program that, when executed by a processor, causes the processor to receive sensor data associated with at least one sensor of the security and automation system; analyze the received sensor data; and initiate a function of the security and automation system based at least in part on the analysis.

Some examples of the method, apparatus, and/or non-transitory computer-readable medium may further include processes, features, means, and/or instructions for: identifying an event associated with an access point of the structure based at least in part on the sensor data; determining a state of a lock component of the access point based at least in part on the event; and modifying the state of the lock component based at least in part on the identified event.

Some examples of the method, apparatus, and/or non-transitory computer-readable medium for identifying the event associated with the access point may further include processes, features, means, and/or instructions for: determining that the event is an exit event associated with a person of the structure. In some examples of the method, apparatus, and/or non-transitory computer-readable medium described above, adjusting the state of the lock component is based at least in part on the exit event.

In some examples of the method, apparatus, and/or non-transitory computer-readable medium described above, initiating the function comprises adjusting the state of the lock component to a locked position based at least in part on the exit event. In some examples of the method, apparatus, and/or non-transitory computer-readable medium described above, wherein initiating the function is performed autonomous of a person input received at a control panel, a doorbell camera, and/or a lock at an access point.

In some examples of the method, apparatus, and/or non-transitory computer-readable medium described above, the sensor data comprises data received from: a sensor in contact with an access point, a sensor in or in contact with a doorbell camera, a sensor associated with an exterior of the structure, a sensor within the structure, a camera, a motion sensor, a control panel, or a combination thereof.

In some examples of the method, apparatus, and/or non-transitory computer-readable medium described above, the sensor data is associated with a lock component at an access point, wherein analyzing the received sensor data comprises determining that the sensor data indicates a person has interacted with an interior side of the lock at the access point. In some examples of the method, apparatus, and/or non-transitory computer-readable medium described above, initiating the function comprises suspending an alarm event based at least in part on determining that the sensor data indicates the person has interacted with the interior side of the lock component at the access point. In some examples of the method, apparatus, and/or non-transitory computer-readable medium described above, initiating the function comprises notifying the person regarding a state of the lock component at the access point.

In some examples of the method, apparatus, and/or non-transitory computer-readable medium described above, notifying the person occurs before the state of the lock component is modified based at least in part on an interaction with the interior side of the lock at the access point. In some examples of the method, apparatus, and/or non-transitory computer-readable medium described above, notifying the person occurs after the state of the lock component is modified and before an alarm event is triggered based at least in part on an interaction with the interior side of the lock component at the access point. In some examples of the method, apparatus, and/or non-transitory computer-readable medium described above, analyzing the received sensor data comprises determining that the sensor data indicates a location of the person relative to the access point.

In some examples of the method, apparatus, and/or non-transitory computer-readable medium described above, initiating the function comprises broadcasting a message regarding a state of a lock component associated with the access point, or an alarm condition associated with the security and/or automation system, or a combination thereof. In some examples of the method, apparatus, and/or non-transitory computer-readable medium described above, analyzing the received sensor data comprises determining that the sensor data indicates a location of the person relative to the access point.

Some examples of the method, apparatus, and/or non-transitory computer-readable medium may further include processes, features, means, and/or instructions for: determining an identity of a person at an access point based at least in part on analyzing the received sensor data. In some examples of the method, apparatus, and/or non-transitory computer-readable medium described above, initiating the function comprises unlocking a lock component associated with one or more access points based at least in part on determining the identity of the person.

Some examples of the method, apparatus, and/or non-transitory computer-readable medium may further include processes, features, means, and/or instructions for: determining that the identified person passed through the access point based at least in part on the received sensor data; and identifying a state of the access point after the identified person passed through the access point. In some examples of the method, apparatus, and/or non-transitory computer-readable medium described above, initiating the function comprises locking a lock component associated with one or more access points based at least in part on determining that the identified person passed through the access point and identifying the state the of the access point.

In some examples of the method, apparatus, and/or non-transitory computer-readable medium described above, analyzing the sensor data comprises determining that the sensor data indicates a location of the person relative to the access point. In some examples of the method, apparatus, and/or non-transitory computer-readable medium described above, initiating the function comprises adjusting a state of a lock component associated with a second access point based at least in part on the sensor data.

In some examples of the method, apparatus, and/or non-transitory computer-readable medium described above, analyzing the identified sensor data comprises determining that the sensor data indicates a location of the person relative to the access point. In some examples of the method, apparatus, and/or non-transitory computer-readable medium described above, initiating the home automation function comprises adjusting a lock state of a plurality of locks each associated with one of a plurality of access points.

A method for security and automation system is described. The method may include receiving an access identifier at an access point; and initiating a home automation function based at least in part on the received access identifier.

An apparatus for reducing false alarms of a security and automation system is described. The apparatus may include a processor, memory in electronic communication with the processor, and instructions stored in the memory. The instructions may cause the processor to receive an access identifier at an access point and initiate a home automation function based at least in part on the received access identifier.

A non-transitory computer readable medium for reducing false alarms of a security and automation system is described. The non-transitory computer readable medium may store a program that, when executed by a processor, causes the processor to receive an access identifier at an access point and initiate a home automation function based at least in part on the received access identifier.

In some examples of the method, apparatus, and/or non-transitory computer-readable medium described above, the wherein initiating the home automation function comprises adjusting a lock state associated with one or more access points based at least in part on the received access identifier, or an identity of a person in proximity to the access point, or a combination thereof.

Some examples of the method, apparatus, and/or non-transitory computer-readable medium may further include processes, features, means, and/or instructions for: identifying an arrival of a person at the access point based at least in part on adjusting the lock state; identifying an exit of the person at the access point based at least in part on the sensor data; and notifying an occupant based at least in part on the identified arrival, or the identified exit, or both.

Some examples of the method, apparatus, and/or non-transitory computer-readable medium may further include processes, features, means, and/or instructions for: capturing data at the access point based at least in part on receiving the access identifier. Some examples of the method, apparatus, and/or non-transitory computer-readable medium may further include processes, features, means, and/or instructions for: capturing data at a location inside within a predetermined distance of the access point based at least in part on receiving the access identifier. Some examples of the method, apparatus, and/or non-transitory computer-readable medium may further include processes, features, means, and/or instructions for: capturing data at a location inside a structure based at least in part on receiving the access identifier and sensor data indicating a person at the location.

Some examples of the method, apparatus, and/or non-transitory computer-readable medium may further include processes, features, means, and/or instructions for: notifying the occupant regarding a status of the access identifier. Some examples of the method, apparatus, and/or non-transitory computer-readable medium may further include processes, features, means, and/or instructions for: notifying, at the access point, the person regarding a status of the access identifier.

A method for security and automation system is described. The method may include identifying sensor data associated with a sensor; determining an identity of a person based at least in part on the sensor data; automatically initiating a home automation function based at least in part on determining the identity of the person.

An apparatus for reducing false alarms of a security and automation system is described. The apparatus may include a processor, memory in electronic communication with the processor, and instructions stored in the memory. The instructions may cause the processor to identify sensor data associated with a sensor; determine an identity of a person based at least in part on the sensor data; automatically initiate a home automation function based at least in part on determining the identity of the person.

A non-transitory computer readable medium for reducing false alarms of a security and automation system is described. The non-transitory computer readable medium may store a program that, when executed by a processor, causes the processor to identify sensor data associated with a sensor; determine an identity of a person based at least in part on the sensor data; automatically initiate a home automation function based at least in part on determining the identity of the person.

Some examples of the method, apparatus, and/or non-transitory computer-readable medium may further include processes, features, means, and/or instructions for: identifying a time associated with the sensor data. In some examples of the method, apparatus, and/or non-transitory computer-readable medium described above, the automatically initiating the home automation function is based at least in part on the time.

Some examples of the method, apparatus, and/or non-transitory computer-readable medium may further include processes, features, means, and/or instructions for: identifying an object based at least in part on the sensor data. In some examples of the method, apparatus, and/or non-transitory computer-readable medium described above, the automatically initiating the home automation function is based at least in part on the identified object.

Some examples of the method, apparatus, and/or non-transitory computer-readable medium may further include processes, features, means, and/or instructions for: identifying a number of people detected at an access point based at least in part on the sensor data. In some examples of the method, apparatus, and/or non-transitory computer-readable medium described above, the automatically initiating the home automation function is based at least in part on identifying the number of people detected at the access point. In some examples of the method, apparatus, and/or non-transitory computer-readable medium described above, the automatically initiating the home automation function comprises unlocking a lock associated with the access point.

In some examples of the method, apparatus, and/or non-transitory computer-readable medium described above, the sensor is associated with an access point. In some examples of the method, apparatus, and/or non-transitory computer-readable medium described above, the automatically initiating the home automation function comprises unlocking a lock associated with another access point. In some examples of the method, apparatus, and/or non-transitory computer-readable medium described above, the automatically initiating the home automation function is performed independent of person input, or an access identifier, or both.

A method for security and automation system at a structure is described. The method may include receiving data associated with a delivery of a package to the structure; detecting a delivery person arriving at an access point of the structure; and providing instructions to the delivery person based at least in part on the detecting.

An apparatus for reducing false alarms of a security and automation system is described. The apparatus may include a processor, memory in electronic communication with the processor, and instructions stored in the memory. The instructions may cause the processor to receive data associated with a delivery of a package to the structure; detect a delivery person arriving at an access point of the structure; and provide instructions to the delivery person based at least in part on the detection.

A non-transitory computer readable medium for reducing false alarms of a security and automation system is described. The non-transitory computer readable medium may store a program that, when executed by a processor, causes the processor to receive data associated with a delivery of a package to the structure; detect a delivery person arriving at an access point of the structure; and provide instructions to the delivery person based at least in part on the detection.

Some examples of the method, apparatus, and/or non-transitory computer-readable medium may further include processes, features, means, and/or instructions for: capturing and image or video of the delivery person at the access point; analyzing the image or video based at least in part on the capturing; and determining an identity of the delivery person. Some examples of the method, apparatus, and/or non-transitory computer-readable medium may further include processes, features, means, and/or instructions for: determining that the lock component associated with the access point is in a lock state; and transmitting an instruction to the lock component to change the lock state of the lock component based at least in part on the identity of the delivery person.

Some examples of the method, apparatus, and/or non-transitory computer-readable medium for transmitting the instruction to the lock component to change the lock state of the lock component of the access point may further include processes, features, means, and/or instructions for: determining an unlock state of another lock component associated with another access point of the structure; and transmitting an instruction to the another lock component associated with the another access point to change the unlock state to a lock state.

Some examples of the method, apparatus, and/or non-transitory computer-readable medium may further include processes, features, means, and/or instructions for: capturing an image or video of the delivery person placing the package in a delivery area of the structure. Some examples of the method, apparatus, and/or non-transitory computer-readable medium may further include processes, features, means, and/or instructions for: transmitting the captured image or video to a remote device.

In some examples of the method, apparatus, and/or non-transitory computer-readable medium described above, the data comprises at least one of a delivery company name, delivery person information, a unique code associated with the delivery person, scheduled date of delivery, an expected time of the delivery, tracking number, number of packages, weight of each package, dimensions of each package, or a combination thereof.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

Figure 1:
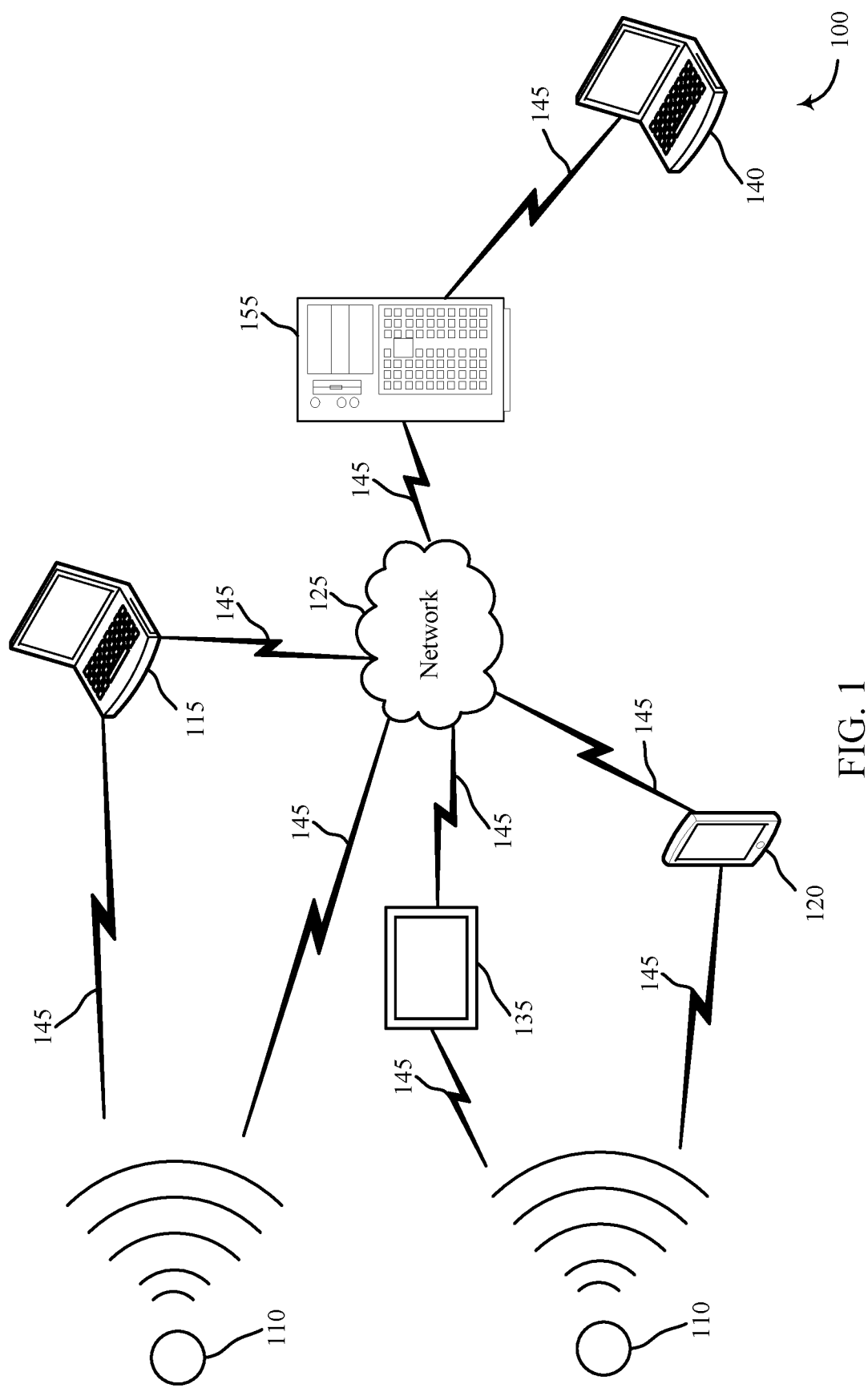
FIG. 1 shows a block diagram relating to an example security and automation system, in accordance with one or more examples of the present disclosure.

FIG. 1 shows a block diagram relating to an example security and automation system 100, in accordance with one or more examples of the present disclosure. The security and automation system 100 may include one or more sensor units 110, local computing device 120, control panel 135, remote computing device 140, and server 155. The network 125 may provide person authentication credentials, encryption, access authorization, tracking, Internet Protocol (IP) connectivity, and other access, computation, modification, and/or functions. The control panel 135 may interface with the network 125 through a first set of wired and/or wireless communication links 145 to communicate with the server 155. The control panel 135 may perform communication configuration, adjustment, and/or scheduling for communication with the local computing device 120 and remote computing device 140, or may operate under the control of a controller. Control panel 135 may communicate with a back-end server (such as the server 155)—directly and/or indirectly—using the first set of one or more wireless communication links 145. In some examples, the server 155 may be a remote server located at a location different or same from the control panel 135, the local computing device 120, and/or the remote computing device 140.

The control panel 135 may wirelessly communicate with the remote computing device 140 and the local computing device 120 by way of one or more antennas. The control panel 135 may provide communication coverage for a respective coverage area (e.g., residential, commercial). In some examples, the control panel 135 may be referred to as a control device, a controller, a base transceiver station, a radio base station, an access point, a radio transceiver, or some other suitable terminology. The coverage area for a control panel 135 may be divided into sectors making up only a portion of the coverage area. The security and automation system 100 may include control panels of different types. In some examples, the security and automation system 100 may include overlapping coverage areas for one or more different parameters, including different technologies, features, subscriber preferences, hardware, software, technology, and/or methods.

For example, one or more control panels 135 may be related to one or more discrete structures (e.g., a residential building, a commercial building, or an industrial building) and each of the one more discrete structures may be related to one or more discrete areas. In other examples, multiple control panels 135 may be related to the same one or more discrete structures (e.g., multiple control panels relating to a home and/or a business complex). For example, one or more control panels 135 may be located within a home. Additionally or alternatively, each room within the home may have a designated control panel 135 located within each room. In some cases, the one or more control panels 135 may communicate with one another via one or more communication protocols. In some examples, the one or more control panels 135 may form a mesh network within the home and communicate with one another via the mesh network. In some examples, a control panel 135 may modify or update a security parameter based on information received from one or more other control panels 135 in the mesh network.

A control panel 135 may receive data associated with a delivery of a package to a structure. For example, the control panel 135 may receive at least one of a delivery company name, delivery person information, a unique code associated with the delivery person, scheduled date of delivery, an expected time of the delivery, tracking number, number of packages, weight of each package, dimensions of each package, or a combination thereof from the local computing device 120, or the remote computing device 140. or the server 155 via network 125. The control panel 135 may detect a delivery person arriving at an access point of the structure, for example, based on sensor data received from the one or more sensor units 110. The control panel 135 may determine a number of zones inside the structure. Each zone may include a security setting and a barrier (e.g., door, window) having a lock mechanism (e.g., lock component as described in FIGS. 2 through 5). The control panel 135 may determine a delivery zone (e.g., a delivery area) for the package inside or outside the structure. The control panel 135 may perform a function based on the detection of the delivery person and the determined delivery zone. For example, the control panel 135 may secure one or more zones (e.g., lock, monitor, track) and unsecure the delivery zone. The one or more secured zones may be referred to as a safe zone. In addition, any activity detected within the secure zone that is associated with an individual other than an authorized individual (e.g., a home owner, authorized visitor, child) may initiate an alarm.

The local computing device 120 or remote computing device 140 may be dispersed throughout the security and automation system 100. In some examples, the local computing device 120 and/or remote computing device 140 may be stationary and/or mobile. In some examples, the local computing device 120 and/or remote computing device 140 may include a cellular phone, a personal digital assistant (PDA), a wireless modem, a wireless communication device, a handheld device, a tablet computer, a laptop computer, a cordless phone, a wireless local loop (WLL) station, a display device (e.g., TVs, computer monitors, etc.), a printer, a camera, and/or the like. The local computing device 120 and/or remote computing device 140 may, additionally or alternatively, include or be referred to by those skilled in the art as a user device, a smartphone, a BLUETOOTH® device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology.

In some examples, a control panel 135 may be a smart home system panel, for example, an interactive panel mounted on a wall or other surface in a person's home. The control panel 135 may be in direct communication via wired or wireless communication links 145 with the one or more sensor units 110, or may receive sensor data from the one or more sensor units 110 via the local computing device 120 and the network 125, or may receive data via the remote computing device 140, the server 155, and the network 125. Additionally or alternatively, the control panel 135 may wirelessly communicate with the sensor units 110 via one or more antennas.

The sensor units 110 may be dispersed throughout the security and automation system 100 and each sensor unit 110 may be stationary and/or mobile. The sensor units 110 may include and/or be one or more sensors that sense: proximity, motion, temperatures, humidity, sound level, smoke, structural features (e.g., glass breaking, window position, door position), time, light, geo-location data of a person and/or a device, distance, biometrics, weight, speed, height, size, preferences, light, darkness, weather, time, system performance, and/or other inputs that relate to a security and/or an automation system. The local computing device 120, the remote computing device 140, and/or a sensor units 110 may be able to communicate through one or more wired and/or wireless connections with various components such as a control panel, base stations, and/or network equipment (e.g., servers, wireless communication points, etc.) and/or the like.

In some examples, one or more sensor units 110 may be located within a structure, e.g., a home. Additionally or alternatively, in some examples, the structure may have a designated sensor unit located within one or more predetermined areas, e.g., one or more rooms of the home. In some cases, the one or more sensor units 110 may communicate with one another via one or more communication protocols. In some examples, the one or more sensor units 110 may form a mesh network within the structure and communicate with one another via the mesh network. In some examples, the mesh network associated with the sensor units 110 may be different or be a part of a mesh network associated with one or more control panels 135.

The wireless communication links 145 shown in the security and automation system 100 may include uplink (UL) transmissions from a local computing device 120 to a control panel 135, and/or downlink (DL) transmissions, from a control panel 135 to the local computing device 120. The downlink transmissions may also be called forward link transmissions while the uplink transmissions may also be called reverse link transmissions. Wireless communication links 145 may include one or more carriers, where each carrier may be a signal made up of multiple sub-carriers (e.g., waveform signals of different frequencies) modulated according to the various radio technologies. Each modulated signal may be sent on a different sub-carrier and may carry control information (e.g., reference signals, control channels, etc.), overhead information, user data, etc. The wireless communication links 145 may transmit bidirectional communications and/or unidirectional communications. Wireless communication links 145 may include one or more connections, including but not limited to, 345 MHz, Wi-Fi, BLUETOOTH®, BLUETOOTH® Low Energy, cellular, Z-WAVE®, 802.11, peer-to-peer, LAN, wireless local area network (WLAN), Ethernet, FireWire®, fiber optic, and/or other connection types related to security and/or automation systems.

In some examples, of the security and automation system 100, the control panel 135, the local computing device 120, and/or the remote computing device 140 may include one or more antennas for employing antenna diversity schemes to improve communication quality and reliability between the control panel 135, the local computing device 120, and the remote computing device 140. Additionally or alternatively, the control panel 135, the local computing device 120, and/or the remote computing device 140 may employ multiple-input, multiple-output (MIMO) techniques that may take advantage of multi-path, mesh-type environments to transmit multiple spatial layers carrying the same or different coded data.

While the local computing device 120 and/or the remote computing device 140 may communicate with each other through the control panel 135 using wireless communication links 145, the local computing device 120 and/or the remote computing device 140 may also communicate directly with one or more other devices via one or more direct communication links (not shown). Examples of direct communication links may include Wi-Fi Direct, BLUETOOTH®, wired, and/or, and other P2P group connections. The control panel 135, the local computing device 120, and/or the remote computing device 140 in these examples may communicate according to the WLAN radio and baseband protocol including physical and medium access control (MAC) layers from IEEE 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be implemented within the security and automation system 100.

In an example, a local computing device 120 and a remote computing device 140 may be custom computing entities configured to interact with the sensor units 110 via network 125, and in some examples, via server 155. In other examples, the local computing device 120 and the remote computing device 140 may be general purpose computing entities such as a personal computing device, for example, a desktop computer, a laptop computer, a netbook, a tablet personal computer (PC), a control panel, an indicator panel, a multi-site dashboard, an iPod®, an iPad®, a smart phone, a mobile phone, a personal digital assistant (PDA), and/or any other suitable device operable to send and receive signals, store and retrieve data, and/or execute modules. The local computing device 120 may include memory, a processor, an output, a data input and a communication module. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some examples, the local computing device 120 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, receiving and displaying data from the sensor units 110.

The processor of the local computing device 120 may be operable to control operation of the output of the local computing device 120. The output may be a television, a liquid crystal display (LCD) monitor, a cathode ray tube (CRT) monitor, speaker, tactile output device, and/or the like. In some examples, the output may be an integral component of the local computing device 120. Similarly, the output may be directly coupled to the processor. For example, the output may be the integral display of a tablet and/or smart phone. In some examples, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing device 120 to the output.

The remote computing device 140 may be a computing entity operable to enable a remote person to monitor the output of the sensor units 110. The remote computing device 140 may be functionally and/or structurally similar to the local computing device 120 and may be operable to receive data streams from and/or send signals to at least one of the sensor units 110 via the network 125. The network 125 may be the Internet, an intranet, a personal area network, a local area network (LAN), a wide area network (WAN), a virtual network, a telecommunications network implemented as a wired network and/or wireless network, etc. The remote computing device 140 may receive and/or send signals over the network 125 via wireless communication links 145 and server 155.

In some examples, the sensor units 110 may be sensors configured to conduct periodic or ongoing automatic measurements related to detecting an occurrence of an event. In some examples, the sensor units 110 may be configured to determine presence, occupancy, identity, and location based on a received request. Each sensor unit 110 may be capable of sensing multiple identification and/or location determining parameters, or alternatively, separate sensor units 110 may monitor separate identification and/or location determining parameters. For example, one sensor unit 110 may determine an identity of a person, while another sensor unit 110 (or, in some examples, the same sensor unit 110) may detect an occupancy of and/or location of the person.

In some examples, the sensor units 110 may be separate from the control panel 135 and may be positioned at various locations throughout the house or the property. In other examples, the sensor units 110 may be integrated or collocated with other house and/or building automation system components, home appliances, and/or other building fixtures. For example, a sensor unit 110 may be integrated with a doorbell or door intercom system, or may be integrated with a front entrance light fixture. In other examples, a sensor unit 110 may be integrated with a wall outlet and/or switch. In other examples, the sensor units 110 may be integrated and/or collocated with the control panel 135 itself. In some examples, each of the sensor units 110, control panel 135, and/or local computing device 120 may include a speaker unit, a microphone unit, and/or a camera unit, among other things.

In some cases, a property may be monitored by the control panel 135 and/or sensor units 110. In some examples, the control panel 135 may include sensor units 110 such that the control panel 135 may directly receive signals (e.g., motion sensed, entry/exit detected) associated with the property. Each sensor unit 110 may be capable of sensing multiple occupancy parameters, or alternatively, separate sensor units may monitor separate occupancy parameters. For example, one sensor unit may be a motion sensor, while another sensor unit may detect security parameters by monitoring vibration or audio. In some cases, sensor units 110 may additionally monitor alternate security and occupancy parameters, for example by monitoring heartbeat or breathing. In some examples, occupancy may be detected by any one of a motion sensor, audio sensor, RFID sensor, video camera, light-break sensor, or a combination thereof. In some examples, the sensor units 110 may be separate from the control panel 135, and may be positioned at various locations, also referred to herein as zones, throughout a property. In other examples, the sensor units 110 may be integrated or collocated with other security and automation system components. For example, a sensor unit 110 may be integrated with a wall, door, window for detecting entry and/or exit of a person relative to the property. In other examples, the sensor units 110 may be integrated or collocated with the control panel 135 itself.

In some cases, the control panel 135 in communication with the sensor units 110 may receive sensor data associated with at least one sensor of a home automation system. In some examples, the control panel 135 may receive a trigger to perform a security function associated with a home automation system. In some examples, the security function may be instructions to arm or disarm a property (i.e., activate alarm parameters). After receiving the instructions, the control panel 135 may determine one or more settings associated with the security and automation system 100. In some examples, the security and/or automation system 100 may be referred to as a home automation system.

In some examples, the control panel 135 may initiate a predetermined time (e.g., time delay, duration, time frame) as one of the settings. The predetermined time may provide a duration where the property's security system is counting down before switching into an armed state. For example, the predetermined time may be a delay duration where a person is given a duration (e.g., 30 seconds) to leave the property without setting off an alarm event. In some cases, the control panel 135 may detect a person exiting the property, and based on detecting the person exiting the property, the control panel 135 may automatically initiate the predetermined time duration at that instance. For example, the control panel 135 may detect that a person exited a home based on received sensor data associated with an entry/exit door, the control panel 135 may then parse sensor data from one or more other sensors located at the property of the home to determine whether an occupancy can be detected (e.g., another person within the home). If the control panel 135 determines that no occupancy is present, the control panel 135 may automatically initiate the predetermined time. In some examples, after the predetermined time lapses, the security and automation system 100 may be in an armed state.

Figure 2:
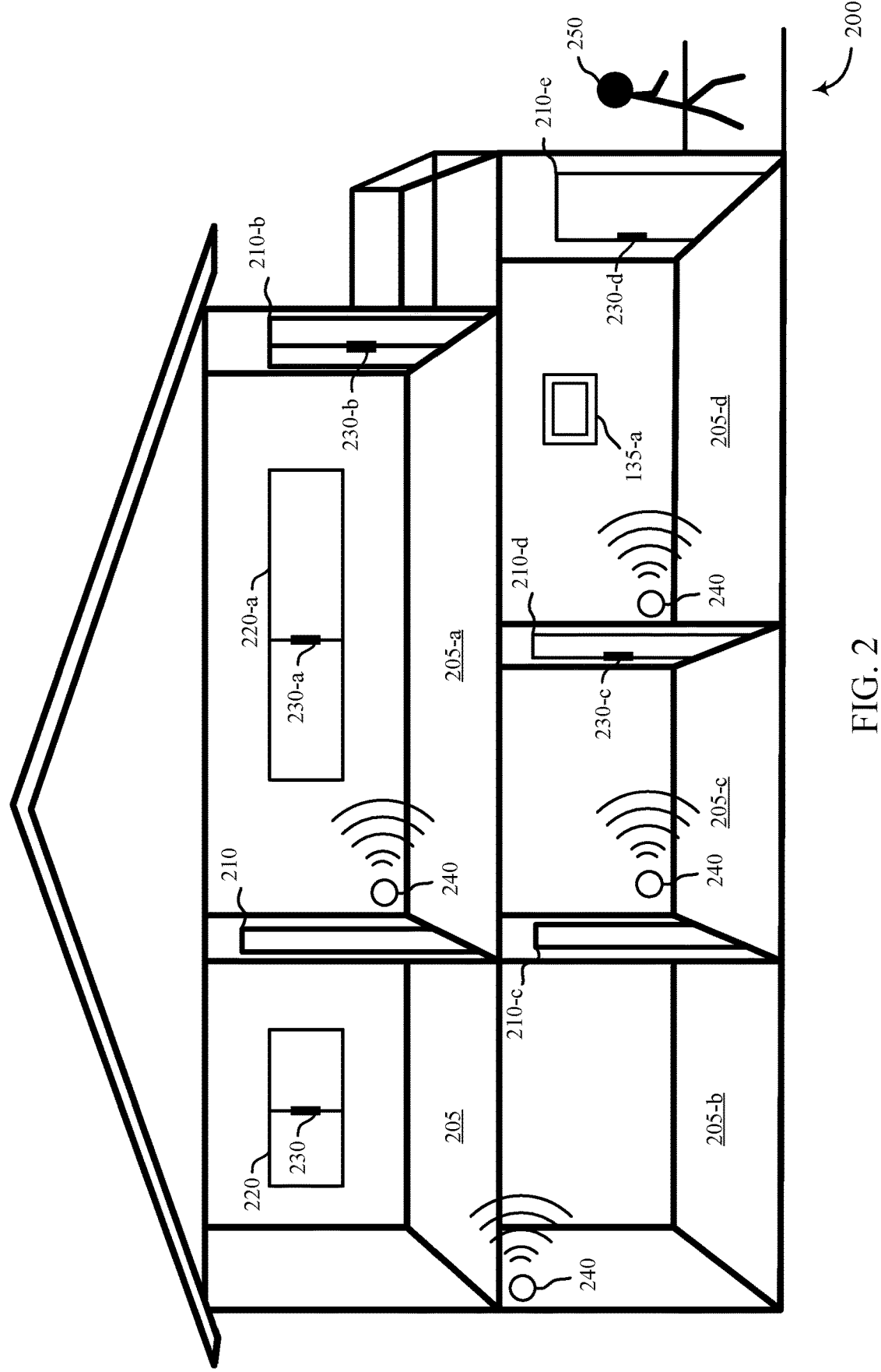
FIG. 2 shows an example diagram relating to an example security and automation environment, in accordance with one or more examples of the present disclosure.

FIG. 2 shows an example diagram relating to an example security and automation environment 200, in accordance with one or more examples of the present disclosure. The security and automation environment 200 may include one or more aspects of the security and automation system 100, as described in FIG. 1. The security and automation environment 200 may include one or more zones 205, one or more sensor units 240, one or more access points 210 and 220, one or more lock components 230, and control panel 135-a. Each of the zones 205 may be associated with a particular room of a house, hotel, office, commercial building, etc.

The control panel 135-a may include one or more examples of a control panel 135 as described in FIG. 1. The control panel 135-a may be a smart home system panel, for example, an interactive panel mounted on a wall of the security and automation environment 200. In some examples, the control panel 135-a may be in direct communication via wired or wireless communication links with the one or more sensor units 240, or may receive sensor data from the one or more sensor units 240. The sensor units 240 may be integrated with a wall, door, window and be configured for detecting entry and/or exit of a person relative to a zone 205. One or more sensor units 240 may include one or more examples of sensor units 110 as described in FIG. 1. The control panel 135-a may also be in direct communication via wired or wireless communication links with the one or more lock components 230. In some cases, the control panel 135-a may transmit a signal to the one or more lock components 230 to change a state of the lock components 230.

Zone 205 may be a bedroom of a structure (e.g., home). The zone 205 may also include interior walls and exterior walls. The zone 205 may also include a floor and a ceiling. In some examples, the zone 205 may include one or more sensors units 240 (not shown) or devices installed, mounted, or integrated with the zone 205. For example, the zone 205 may have a motion sensor installed or mounted on a wall of the zone 205. The motion sensor may detect whether the zone 205 is occupied and report collected sensor data to the control panel 135-a. In some examples, the zone 205 may include an access point 210 and an access point 220. The access point 210 may have a door or be an open entry. Alternatively, the access point 220 may be a window. In some examples, the zone 205 may include a lock component 230. The access point 220 may include lock component 230, while the access point 210 may be absent of a lock component 230, e.g., when the access point 210 is an open entry-way.

Additionally or alternatively, the security and automation environment 200 may include a zone 205-a. Similarly, the zone 205-a may be a bedroom, living room, etc., of a structure. In some examples, the zone 205-a and the zone 205 may be separated at least partly from each other via walls of the security and automation environment 200. Similarly, the zone 205-a may include one or more sensor units 240 installed, mounted, or integrated with the zone 205-a. For example, the zone 205-a may have a camera/video sensor installed or mounted on a wall of the zone 205-a. The camera/video sensor may capture still images or record video of a field-of-view of the zone 205-a. In some cases, one or more sensor units 240 of the zone 205-a may transmit captured images or recorded video to the control panel 135-a for further processing.

The zone 205-a may also include access points 210 and 210-b, and an access point 220-a. In some examples, the zone 205 and the zone 205-a share the access point 210. Similarly, the access points 220-a and 210-b may include lock components 230-a and 230-b. The lock component 230-a and lock component 230-b may, in some examples, adjust a state of the access point 220-a and the access point 210-b. For example, the access point 220-a may be a window and the lock component 230-a may be a locking mechanism that may lock or unlock the window. Similarly, the access point 210-b may be a sliding door to a patio. The lock component 230-b may provide access to the patio based on a state of the lock component 230-b (i.e., locked or unlocked). In some cases, the lock component 230-a and the lock component 230-b may adjust a state based on sensor data collected and identified by the sensor unit 240 of the zone 205-a. Alternatively, the lock component 230-a and the lock component 230-b may change a state based on instructions received from the control panel 135-a.

Zone 205-b may, similarly to the zone 205 and 205-a, include interior walls and/or exterior walls. The zone 205-b may also include a floor and a ceiling. In some examples, the floor of the zone 205-b may include one or more sensors integrated with it. For example, the floor may include pressure sensors to detect a person walking. In some examples, the one or more sensor units 240 may be integrated with the floor to detect a person and identify the detected person. The sensor units 240 may report the detection and identification of the person in zone 205-b to the control panel 135-a for further processing. In some cases, the zone 205-b may include an access point 210-c, which may be an open entry access point with no lock component. The zone 205-b may include one or more sensor units 240 to monitor one or more conditions of the zone 205-b. For example, the one or more sensor units 240 may monitor a temperature of the zone 205-b, motion at the zone 205-b, sound at the zone 205-b, light at the zone 205-b, etc.

Zone 205-c may, similarly to the zones 205 through 205-b, include interior walls and/or exterior walls. The zone 205-c may also include a floor and a ceiling. Additionally, the zone 205-c may include one or more sensor units 240. The one or more sensor units 240 of zone 205-c may be installed, mounted, or integrated within zone 205-c. Zone 205-c may include an access point 210-c that is shared with zone 205-b. The zone 205-c may also include an access point 210-d shared with zone 205-d. Zone 205-d may, likewise to the zones 205 through 205-c, include interior walls and/or exterior walls. The zone 205-d may also include a floor and a ceiling. Additionally, the zone 205-d may include one or more sensor units 240, an access point 210-d that is shared with the zone 205-c. The zone 205-d may also include an access point 210-e. The access point 210-e may be a main entry point to the structure of the security and automation environment 200. The access point 210-e may include a lock component 230-d. The one or more sensor units 240 of the zone 205-d may be installed, mounted, or integrated within the zone 205-d. For example, the lock component 230-d may be a doorbell camera. The control panel 135-*a* may be located within the zone 205-*d*. In some examples, the zone 205-*d* may be an entry room (e.g., foray room of a home).

In some examples, the security and automation environment 200 may determine a person within a range of an access point based on sensor data received from one or more sensor units 240. Based on determining that the person is within the range of the access point, the control panel 135-*a* may identify the person. In some examples, identifying the person may be based on a device carried by the person. For example, the device may be a GPS tracking device worn or carried by the person. The GPS tracking device may include a small security hardware device (e.g., fob, token, charm). In some examples, the GPS tracking device may include an RFID mid-range device, or NFC device. Additionally or alternatively, the identifying may be based on bio-recognition (e.g., fingerprint, voice, facial). In some examples, a person may speak a verbal message (e.g., password) at the lock component 230-*d* that may include a microphone in addition to a doorbell camera. The verbal message may be recorded and transmitted to the control panel 135-*a* for analysis. For example, the control panel 135-*a* may perform voice processing to identify that the verbal message was spoken by an authorized individual of the structure. As a result, the control panel 135-*a* may transmit instructions to the lock component 230-*d* to change a state from locked to unlocked.

Some examples, of the security and automation environment 200 may determine operation of an access point (e.g., access point 210 through 210-*e* and/or access point 230 through 230-*a*). In some examples, one or more sensor units 240 in communication with the control panel 135-*a* may determine whether an access point is operated from an exterior side or an interior side. As such, the control panel 135-*a* may control a state of one or more of the lock components 230-*a* through 230-*d* or a feature of a home automation system based on the determined operation of the access point.

In some examples, determining whether the access point is operated from the exterior side or the interior side may include operating at least one touch sensor (e.g., capacitive touch). In some examples, determining whether the access point is operated from the exterior side or the interior side may be based on proximity detection. In some examples, determining whether the access point is operated from the exterior side or the interior side may be based on geo-location data transmitted by a device carried by the person. Determining whether the access point is operated from the exterior side or the interior side may include operating at least one motion sensor. In some cases, determining whether the access point is operated from the exterior side or the interior side may include operating at least one mechanical button or switch. In some examples, one or more sensor units 240 may wirelessly transmit sensor data associated with the access point to the control panel 135-*a*. The control panel 135-*a* may analyze and determine whether the access point is operated from the exterior side or the interior side based on the analysis of the sensor data. In some examples, the control panel 135-*a* and/or one or more lock components 230 may suspend an alarm based on determining that sensor data from a sensor unit 240 indicates that the person 250 has interacted with an interior side of a lock component at an access point.

A lock component may change its state based on a sequence code input at an access point of the lock component. In some examples, one or more access point 210 through 210-*e*, or one or more access point 220 through 220-*a*, or a combination thereof may be integrated with one or more sensor units 240 that may be pressure sensors. The pressure sensors may detect a knocking sequence at a corresponding access point. The knocking sequence may be analyzed by the one or more sensor units 240 in communication with the control panel 135-*a* to identify whether the knocking sequence is associated with a preconfigured knocking sequence. For example, a knocking sequence may include a frequency of knocks, a force and/or vibration of the knock, a duration between knocks, or a combination thereof. In some examples, the lock components 230 through 230-*d* may change a state (e.g., lock to unlock) based on the knocking sequence at the corresponding access point (e.g., access point 210 through 310-*e*, or one or more access point 220 through 220-*a*). Additionally or alternatively, the control panel 135-*b* may identify the person based on a GPS tracking device which may include a small security hardware device (e.g., fob, token, charm) in combination with the knocking sequence. In some examples, the GPS tracking device may include an RFID mid-range device, or NFC device. In some cases, the person may unlock or lock an access point via an application running on a mobile device carried by the person. The application may be installed and in communication with a security system executing on the control panel 135-*a*.

In some examples, the security and automation environment 200 may determine when a person (i.e., person 250) has exited a home. For example, the control panel 135-*a* and/or one or more of the lock components 230 may receive sensor data from one or more of the sensor units 240 dispersed throughout zones 205 through 205-*d*. In some examples, the control panel 135-*a* and/or one or more of the lock components 230 through 230-*d* may include sensor units 240 such that the control panel 135-*a* and/or lock components 230 through 230-*d* may directly receive signals (e.g., motion sensed, entry/exit detected) associated with the structure. Each sensor unit 240 may be capable of sensing multiple occupancy parameters, or alternatively, separate sensor units 240 may monitor separate occupancy parameters. For example, one sensor unit 240 may be a motion sensor, while another sensor unit 240 may detect security parameters by monitoring vibration or audio. In some cases, sensor units 240 may additionally monitor alternate security and occupancy parameters, for example by monitoring heartbeat or breathing. In some examples, occupancy may be detected by any one of a motion sensor, audio sensor, RFID sensor, video camera, light-break sensor, or a combination thereof.

The sensor units 240 may be separate from the control panel 135-*a* and/or one or more of the lock components 230 through 230-*d*, and may be positioned at various locations in zones 205 through 205-*d*. In other examples, the sensor units 240 may be integrated or collocated with other security and automation system components (e.g., smart home appliances, lighting fixtures, smart outlets and/or switches). After receiving the sensor data, the control panel 135-*a* and/or one or more of the lock components 230 through 230-*d* may analyze the sensor data.

In some cases, the control panel 135-*a* and/or one or more of the lock components 230 through 230-*d* in communication with one or more sensor units 240 may determine to trigger a security function associated with a home automation system. In some examples, the security function may be instructions to arm a structure or property. After receiving the instructions, the control panel 135-*a* may determine one or more settings associated with the security and automation environment 200. The one or more setting may include instructing the lock component 230 through 230-a or lock component 210 through 210-e to adjust a state. For example, control panel 135-a may transmit instructions to lock components 230 through 230-a to change to a locked state. In some examples, the control panel 135-a and/or one or more lock components 230 may identify an event associated with an access point of the structure based on the sensor data. The control panel 135-a and/or one or more lock components 230 may determine a state of a lock component of an access point based on the event, and modify a state of the lock component. For example, the control panel 135-a and/or one or more lock components 230 may detect person 250 exiting the property, and based on detecting person 250 exiting the property, the control panel 135-a and/or one or more lock components 230 may automatically initiate a function of the home automation system. In some examples, initiating the function is performed autonomous of a user input received at a control panel, a doorbell camera, and/or a lock at an access point.

In some examples, the control panel 135-a in communication with one or more sensor units 240 may detect an occurrence of an event associated with a structure. In some examples, an event may include a person exiting a structure. In one example, the occurrence of the event may be within a structure (e.g., home). In another example, the occurrence of the event may be within a predetermined boundary outside of the structure. The control panel 135-a may detect that person 250 exited a home based on received sensor data associated with an entry/exit access point, the control panel 135-a may then parse sensor data from one or more other sensors located at the structure to determine whether an occupancy can be detected (e.g., another person within the home). If the control panel 135-a determines that no occupancy is present, the control panel 135-a may automatically initiate transmitting instructions to lock components 230 through 230-d to change a state. In some cases, the control panel 135-a may automatically initiate transmitting instructions to lock components 230 through 230-d to change a state regardless of detecting occupancy at the home.

In some examples, the control panel 135-a in communication with one or more sensor units 240 may receive sensor data from at least one sensor associated with the home automation system based on the exit event. In some examples, the presence may be detected by actions performed in or outside a structure, or by detecting occupants at the structure and subsequently the occupants exiting the structure. In an example, the at least one sensor may be linked to an access point (e.g., door sensor or window sensor) which may detect when a door or window to a structure (e.g., residence) is opened and when a person exits the structure. In some examples, a person may be a sole occupant of the structure, or may join other occupants currently present at the structure.

The control panel 135-a in communication with one or more sensor units 240 may determine an occupancy at the location of the structure based on the sensor data. In some examples, a structure or property may include a motion sensor, heartbeat sensor, breathing sensor, vibration sensor, or any other known occupancy detection means, to detect the presence of a person at or near the structure. In some examples, occupancy may alternatively be manually inputted by a person using a local computing device such as a smartphone, or may be automatically detected by a location sensor integrated with the local computing device or by a communication between the local computing device and another component (e.g., control panel). In some examples, occupancy may be determined based on sensor data indicating that there is movement in the kitchen, or that a smartphone signal is being detected in a bedroom. In some examples, the detected occupancy may be communicated to a remote computing device, such as a central security operating station or a personal computing device of a third party caller, where the occupancy may be displayed, for example in the form of a list, or in the form of a map of the structure or property.

In some examples, the control panel 135-a in communication with one or more sensor units 240 may confirm an identity associated with an occupant at the location of structure based on the determined occupancy. In some examples, a person's identity may be determined based on identifying the location of a portable electronic device, belonging to a person associated with the structure, through GPS. Additionally or alternatively, an identity of a person may be confirmed using a retinal scanner, a fingerprint scanner, a voiceprint sensor, a camera calibrated to identify facial structure, a GPS receiver or a input device (e.g. a keypad) into which a user may input a personal identification number (PIN) or any other known identification detection means to detect the occupancy of a person and to determine the person's identity at or near a structure or property, for example, at a lock component located outside of the structure.

In some examples, the sensor data may include data received from a sensor unit 240 in contact with an access point, a sensor unit 240 in or in contact with a doorbell camera, a sensor unit 240 associated with an exterior of the home, a sensor unit 240 within the home, a camera, a motion sensor, a control panel, or a combination thereof. In some cases, the control panel 135-a may transmit the instructions after a predetermined duration. For example, in cases where the person 250 exits the home and returns before the predetermined duration lapses, the control panel 135-a will not have to initiate the lock component 230-d to change from a locked state to an unlocked state. In some examples, the control panel 135-a and/or one or more lock components 230 may delay an alarm based on determining that sensor data from a sensor unit indicates that the person 250 has interacted with an interior side of a lock component at an access point.

In some cases, one or more of the lock components 230 through 230-d may provide an indication of a state of the lock component. In some cases, the indication may be provided at an interior side of the lock components 230 through 230-d, or, additionally or alternatively, an exterior side of the lock component 230 through 230-d, or a combination thereof. In some cases, lock components 230 through 230-d may be integrated with a light component that may cast a light when the lock component is in a particular state. For example, the light component may be illuminated or cast a light down or up when a corresponding lock component 230 through 230-d is in a particular state (e.g., locked or unlocked). Alternatively, in some cases, the lock components 230 through 230-d may be integrated with one or more LED lights. The LED lights may be colored or non-colored. In some cases, the lock components 230 through 230-d may indicate additional information based on an LED light illuminated at one or more of the lock components 230 through 230-d. For example, a first color LED projection may indicate a state of the lock component, while a second LED projection may indicate that security and automation environment 200 is also armed. In some cases, the lock components 230 through 230-d may be integrated or associated with a display that may provide an indication to a person, a state of a corresponding lock component. The display of a lock component 230 may be located on an interior side of the lock component. For example, on the interior side of a door associated with the lock component 230, the display may provide an indication that the lock component is either in a locked state or an unlocked state.

Additionally or alternatively, the lock components 230 through 230-d may include an audible message component that may broadcast an audible indication to a person. The audible indication may alert the person a state of a lock component. In some examples, the audible message component may broadcast the audible indication based on a proximity of the person to a lock component. For example, the person 250 may be returning to the home, and the lock component 230-d may detect that that person 250 is within a proximity threshold such that the audible message component may broadcast the audible indication to the person 250. The lock components 230 through 230-d may also project tactile output. A tactile output may be a vibration. In some cases, the projected tactile output may indicate that a corresponding lock component is in a locked state. Additionally, the projected tactile output may be an indication that the security and automation environment 200 is in an armed state.

In some examples, the one or more sensor units 240 in communication with the lock components 230 through 230-d may determine whether an access point is completely closed before the lock components 230 through 230-d adjust a state (e.g., transition from unlocked to locked). In some cases, the security and automation environment 200 may determine whether an access point is completely closed based on received sensor data from one or more sensor units 240 integrated with an access point. The one or more sensor units 240 that may be integrated with an access point, for determining whether the access point is completely closed, may include an open and close magnet sensor, an accelerometer sensor, a light sensor, a laser for detecting a position of an access point, or a separate computing device, or a combination thereof.

In some examples, the sensor units 240 may include a hinge sensor installed or mounted with a hinge or a portion of an access point. As a result, the sensor units 240 may determine movement of the access point (e.g., movement from a closed position to an open position, or movement from one open position to another open position). The sensor units 240 may also include, for example, a potentiometer, an electrostatic sensor, a piezoelectric sensor, or a magnetic sensor. In some cases, two sensor units 240 may be assigned to an access point, for instance a first sensor unite 240 may be a hinge sensor and a second sensor unite 240 may be a motion sensor. The two sensor units 240 may be used to confirm that the access point is moved and/or that a person, has moved through the opening (e.g., doorway) associated with the access point.

In some examples, the control panel 135-a may determine to notify a person associated with the security and automation environment 200 based on received sensor data. For example, the control panel 135-a may notify a person when an exit event is detected. In some examples, notifying a person may include transmitting and/or broadcasting a message notifying the person regarding a state of a lock component at an access point. In some cases, notifying the person occurs before the state of a lock component is modified based on an interaction with the interior side of the lock at the access point. The message may include a verbal message or a written message. For example, a verbal message may be an automated message transmitted to a device associated with a person. Alternatively, the verbal message may be broadcasted at the control panel 135-a. In some examples, a written message may be transmitted to device of a person. For example, an SMS message, an email, a notification message, etc. The written message may, additionally or alternatively, be displayed at the control panel 135-a. In some cases, the notifying may be transmitted and/or broadcasted automatically by the control panel 135-a. The notifying may also be transmitted and/or broadcasted based on person and/or system preferences. In some examples, the notifying may be transmitted and/or broadcasted based on preconfigured settings. Alternatively, the notifying may be transmitted and/or broadcasted based on received input via a device or at the control panel 135-a by a person or a received authorization.

Figure 3:
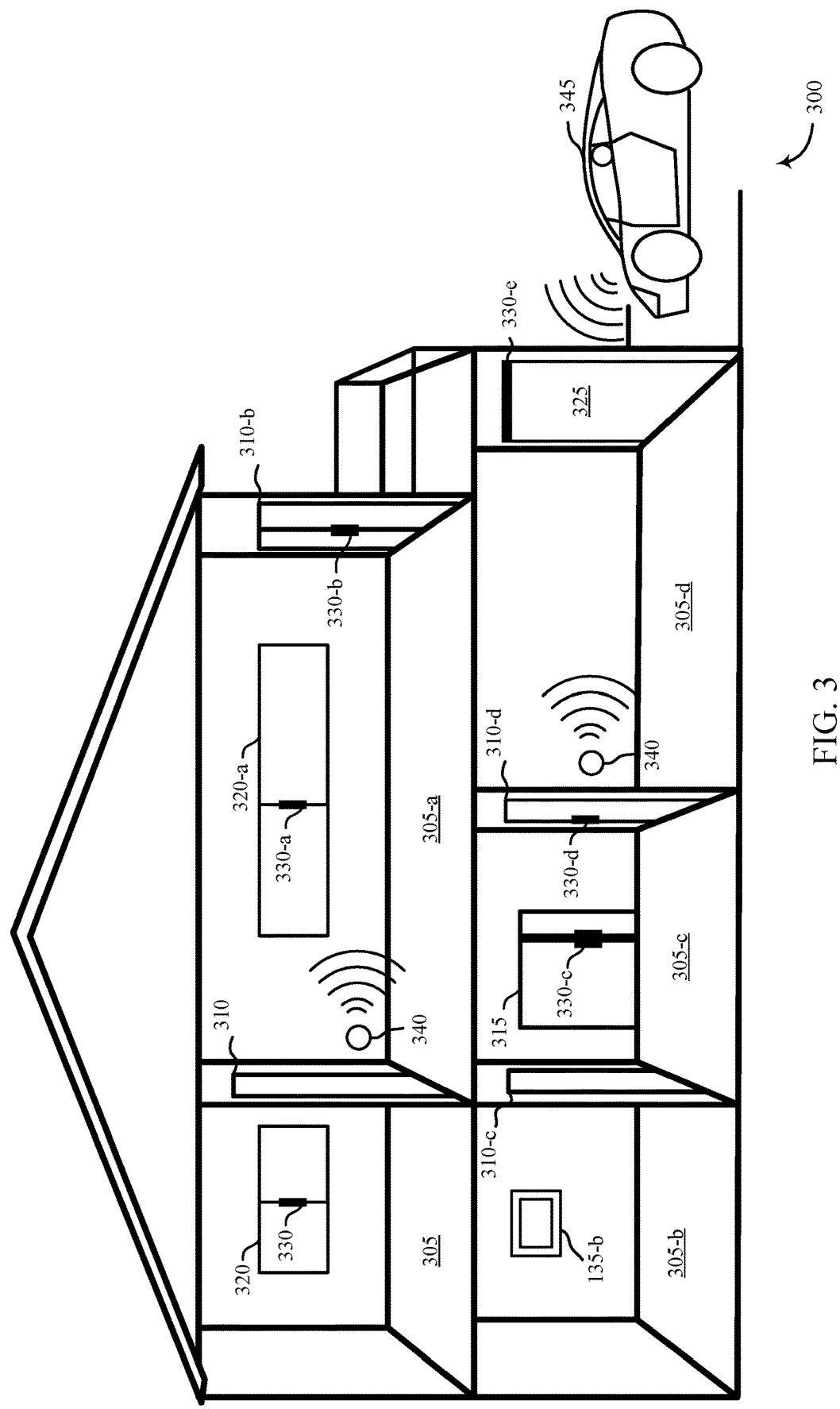
FIG. 3 shows an example diagram relating to an example security and automation environment, in accordance with one or more examples of the present disclosure.

FIG. 3 shows an example diagram relating to an example security and automation environment 300, in accordance with one or more examples of the present disclosure. The security and automation environment 300 may include one or more zones 305, one or more sensor units 340, one or more access points 310 and 320, one or more lock components 330, and a control panel 135-b. The control panel 135-b may include one or more examples of the control panel 135 and the control panel 135-a as described in FIGS. 1 and 2. The control panel 135-b may be a smart home system panel, for example, an interactive panel mounted on a wall of the security and automation environment 300. In some examples, the control panel 135-b may be in direct communication via wired or wireless communication links with the one or more sensor units 340, or may receive sensor data from the one or more sensor units 340. One or more sensor units 340 may be integrated with a wall, door, and/or window for detecting entry and/or exit of a person relative to a zone. The sensor units 340 may include one or more examples of the sensor units 110 and 240 as described in FIGS. 1 and 2. The control panel 135-b may also be in direct communication via wired or wireless communication links with the one or more lock components 330, and transmit a signal to the one or more lock components 330 to change a state (e.g., locked to unlocked).

Zone 305 may be a room of a structure (e.g., a residential building, a commercial building, or an industrial facility) associated with the security and automation environment 300. The zone 305 may include interior walls, exterior walls, a floor, and a ceiling. In some examples, the zone 305 may include one or more sensors units 340 (not shown) or devices installed, mounted, or integrated with the zone 305. For example, the zone 305 may have a motion sensor installed or mounted on a wall that may detect whether the zone 305 is occupied and report collected sensor data (e.g., occupancy data) to the control panel 135-b. In some examples, the zone 305 may include an access point 310 and an access point 320. The access point 310 may be an entrance including a barrier or an open entry. Alternatively, the access point 320 may be a window. In some examples, the access point 320 may include lock component 330, while the access point 310 may be absent of a lock component e.g., when the access point 310 is an open entry-way.

The security and automation environment 300 may also include a zone 305-a. The zone 305-a may be a bedroom, living room, etc., of a structure. In some examples, the zone 305-a and the zone 305 may be separated at least partly from each other via walls of the security and automation environment 300. The zone 305-a may include one or more sensor units 340 installed, mounted, or integrated with the zone 305-a. For example, the zone 305-a may have a camera sensor installed or mounted on a wall that may capture still images or record video, and transmit the images or video to the control panel 135-*b*.

The zone 305-*a* may also include an access points 310 and 310-*b*, and an access point 320-*a*. The zone 305 and the zone 305-*a* may share the access point 310. Similarly, the access points 320-*a* and 310-*b* may include lock components 330-*a* and 330-*b*. The lock component 330-*a* and the lock component 330-*b* may, in some examples, alter a state of the access point 320-*a* and the access point 310-*b*. For example, the access point 320-*a* may be a window and the lock component 330-*a* may be a locking mechanism that may lock or unlock the window. Similarly, the access point 310-*b* may be a sliding door to a patio, and the lock component 330-*b* may provide access to an exterior area of the structure based on a state of the lock component 330-*b* (i.e., locked or unlocked). In some cases, the lock component 330-*a* and the lock component 330-*b* may change a state based on sensor data collected and identified by a sensor unit 340 of the zone 305-*a*, or based on instructions received from the control panel 135-*b*.

Zone 305-*b* may also include interior walls, exterior walls, a floor, and a ceiling. The floor and/or ceiling of the zone 305-*b* may include one or more sensors integrated with it. For example, the floor may include a pressure sensor that may detect a person walking and identify the detected person. The sensor units 340 may report the detection and identification of the person in zone 305-*b* to the control panel 135-*b*. In some cases, the zone 305-*b* may include an access point 310-*c*, which may be an open entry access point with no lock component. The zone 305-*b* may include one or more sensor units 340 to monitor one or more conditions of the zone 305-*b*. For example, the one or more sensor units 340 may monitor a temperature of the zone 305-*b*, motion at the zone 305-*b*, sound at the zone 305-*b*, light at the zone 305-*b*, etc.

Zone 305-*c* may also include interior walls, exterior walls, a floor, and a ceiling. Additionally, the zone 305-*c* may include one or more sensor units 340. The one or more sensor units 340 of the zone 305-*c* may be installed, mounted, or integrated within the zone 305-*c*. The zone 305-*c* may include an access point 310-*c* that may be shared with the zone 305-*b*. The zone 305-*c* may also include an access point 310-*d* shared with the zone 305-*d*. The zone 305-*d* may similarly to the zones 305 through 305-*c*, include interior walls, exterior walls, a floor, and a ceiling. The zone 305-*d* may include one or more sensor units 340, an access point 310-*d* that may be common with the zone 305-*c*. The zone 305-*d* may also include an access point 310-*e*. The access point 310-*e* may be a main entry point to the structure of the security and automation environment 300. The access point 310-*e* may include a lock component 330-*d*. The one or more sensor units 340 of zone 305-*d* may be installed, mounted, or integrated within zone 305-*d*. For example, the lock component 330-*d* may be a doorbell camera. The control panel 135-*b* may be located within the zone 305-*d*. In some examples, the zone 305-*d* may be an entry room (e.g., foray room of a home).

In some examples, the security and automation environment 300 may detect an object in proximity to the access point 325. In some cases, one or more sensor units 340 may include motion sensor, a proximity sensor, a camera, among others. For example, a motion sensor may detect motion in proximity of access point 325. After the motion sensor detects motion, the proximity sensor may detect that an object 345 is within range of access point 325. In some cases, the proximity sensor may transmit instructions to a camera to capture image and/or video of a field-of-view associated with access point 325 based on the detected object 345 being within a range of access point 325 that satisfies a threshold. The camera may then capture an image and/or record video of object 345, and transmit the captured image or recorded video to control panel 135-*b* for further processing.

The control panel 135-*b* may perform image analysis and video analytics to identify object 345. For example, the control panel 135-*b* may identify that a captured image or video includes a vehicle and identifies an anomaly within the vehicle. Based on image analysis techniques and/or video analytics, the control panel 135-*b* may identify a license plate of the vehicle and compare the license plate number to one or more profiles of persons associated with the structure. For example, a database (e.g., a local database at the structure or a remote database) may include profiles that may include information associated with a person of the structure. For instance, a profile may indicate that John an occupant of the structure drives a certain car make and is associated with a unique license plate number. As a result, the control panel 135-*b* may determine that the object 345 is associated with a car make that is correlated with John. The control panel 135-*b* may additionally perform image recognition techniques to identity the detected anomaly inside the object 345. In this case, the control panel 135-*b* may identify and validate that the anomaly within object 345 is John. The control panel 135-*b* may transmit instructions to the lock component 330-*e* of the access point 325 to change a state. For example, in the case that the access point 325 is a garage door, the lock component 330-*e* may be a garage door actuator that may prompt opening the garage door. Additionally, based on determining that a person associated with the structure has arrived, the control panel 135-*b* may also transmit instructions to the remaining lock components 330 through 330-*d* to change states, e.g., from locked to unlocked.

Additionally or alternatively, in some examples, the control panel 135-*b* may determine that an occupant of the structure is proximate to an interior or exterior side of the access point 325 based on behavioral data of persons associated with the structure. For example, the control panel 135-*b* may determine a time associated with the detected object 345 proximate an exterior side of the access point 325. The control panel 135-*b* may then correlate that time with one or more schedule data associated with persons of the structure. For example, the control panel 135-*b* may identify that John returns home from work every day at 5:00 pm based on John's schedule data. The control panel 135-*b* may compare the time of the detected object 345, and determine whether the detected object is John. In some cases, the control panel 135-*b* may perform additional certainty computations to determine that John is in fact associated with the detected object 345 by performing the recognition techniques described above.

Alternatively, the object 345 (e.g., vehicle) may transmit a signal to the lock component 330-*e* automatically based on being within a range of the access point 325. The lock component 330-*e* may receive the signal and transmit information associated with the signal to the control panel 135-*b*. For example, the signal may include information identifying the object 345 and the request for the lock component 330-*e* to change states (e.g., locked to unlocked). As a result, the control panel 135-*b* may confirm the request and transmit an acknowledgement signal to the lock component 330-*e* to change states. In some examples, control panel 135-*b* may also transmit instructions to the remaining lock components 330 through 330-*d* to change states, e.g., from locked to unlocked based on the received signal from the object 345.

In some examples, one or more sensor units 340 may determine that the detected object 345 has entered the zone 305-*d*. The one or more sensor units 340 may also track and monitor a location of a person associated with the object 345, after determining entry of the object 345 into the zone 305-*d*. In one case, the control panel 135-*b* may instruct lock component 330-*e* to change states from unlocked to locked (e.g., closing the garage door) based on received sensor data indicating that the object 345 has entered the zone 305-*d*. In some cases, after determining that object 345 has entered zone 305-*d*, control panel 135-*b* may transmit instructions to lock component 310-*d* to change states (e.g., from locked to unlocked). In some cases, one or more sensor units 340 of zone 305-*c* (not shown) may identify that the person has entered zone 305-*c*. As a result, control panel 135-*b* may transmit instructions to lock component 310-*d* to change states (e.g., unlocked to locked).

In some examples, the security and automation environment 300 may detect an object proximate to an interior side or exterior side of access point 315 (e.g., main door). In some cases, one or more sensor units 340 may include a doorbell camera, motion sensor, a proximity sensor, among others. For example, a motion sensor may detect motion proximate the interior side or the exterior side of the access point 315. After the motion sensor detects motion, the proximity sensor may detect that an object is within range of the access point 315. In some cases, the proximity sensor may transmit instructions to a doorbell camera to capture image and/or video of a field-of-view associated with the access point 315 based on the detected object being within a range of the access point 315 that satisfies a threshold. The doorbell camera may capture an image or record a video of the object, and transmit the image or video to the control panel 135-*b*.

The control panel 135-*b* may perform image analysis and video analytics to identify the object. For example, the control panel 135-*b* may identify that a captured image or video includes a person. Based on image analysis techniques and/or video analytics, the control panel 135-*b* may identify the person by comparing the facial features to one or more profiles of persons associated with the structure. As a result, the control panel 135-*b* may determine that the person is an authorized individual of the structure. In some examples, the control panel 135-*b* may transmit instructions to the lock component 330-*c* of the access point 315 to change a state. For example, in the case that the access point 315 is a main door, the lock component 330-*c* may be a locking mechanism that may prompt opening the main door. Additionally, based on determining that a person associated with the structure has arrived, the control panel 135-*b* may also transmit instructions to the remaining lock components 330 through 330-*d* to change states, e.g., from locked to unlocked.

In some examples, identifying of the person (e.g., child) may be based on a device carried by the person. For example, the device may be a GPS tracking device worn or carried by the child. The GPS tracking device may include a small security hardware device (e.g., fob, token, charm). In some examples, the GPS tracking device may include an RFID mid-range device, or NFC near-range device. Additionally or alternatively, the identifying may be based on bio-recognition (e.g., fingerprint, voice, facial). In some examples, a child may speak a verbal message (e.g., password) at the lock component 330-*c* that may include a microphone in addition to the doorbell camera. The verbal message may be recorded and transmitted to the control panel 135-*b* for analysis. For example, the control panel 135-*b* may perform voice processing to identify that the verbal message was spoken by an authorized individual of the structure (i.e., child). As a result, the control panel 135-*b* may transmit instructions to the lock component 330-*c* to change states from locked to unlocked.

A lock component may change its state based on a sequence code input at an access point of the lock component. In some examples, one or more access point 310 through 310-*d*, access point 315, or one or more access point 320 through 320-*a*, or a combination thereof may be integrated with one or more sensor units 340 that may be pressure sensors. The pressure sensors may detect a knocking sequence at a corresponding access point. The knocking sequence may be analyzed by the one or more sensor units 340 in communication with the control panel 135-*b* to identify whether the knocking sequence is associated with an preconfigured knocking sequence. For example, a knocking sequence may include a frequency of knocks, a force and/or vibration of the knock, a duration between knocks, or a combination thereof. In some examples, the lock components 330 through 330-*e* may change a state (e.g., lock to unlock) based on the knocking sequence at the corresponding access point (e.g., access point 310 through 310-*d*, access point 315, or one or more access point 320 through 320-*a*).

Additionally or alternatively, in some examples, the control panel 135-*b* may determine that an occupant of the structure is proximate to an interior side or an exterior side of the access point 315 based on behavioral data of persons associated with the structure. For example, the control panel 135-*b* may determine a time associated with the detected person is proximate to an interior side or an exterior side of the access point 315. The control panel 135-*b* may then correlate that time with one or more schedule data associated with persons of the structure. For example, control panel 135-*b* may identify that Kyle returns home from school every day at 3:00 pm based on Kyle's schedule data. The control panel 135-*b* may then compare the time of the detected person, and determine whether the detected person is Kyle. In some cases, the control panel 135-*b* may perform additional certainty computations to determine that Kyle is in fact associated with the detected person by performing the recognition techniques described above.

In some examples, the control panel 135-*c* may receive instructions from a device to determine a location of one or more occupants of the structure. For examples, a parent of a home may want to track and acquire location information inside and/or outside of the home for one or more children. The parent may send a request to the control panel 135-*c*, using his device (e.g., mobile device, laptop, computing device). The request may include an instruction from the parent to determine the locations of the one or more children. A device that the parent may use to send the request may be representative of the local computing device 115, 120, or remote computing device 140. In some examples, the control panel 135-*c* may determine a location of one or more occupants based on location parameters that may include sensor data received from one or more sensor units 340 located within and outside the structure, a geo-fence perimeter associated with the security and automation environment 300, schedule data associated with the one or more children, and a location received from the child's mobile device or other GPS tracking device worn or carried by the child. The GPS tracking device may include a small security hardware device (e.g., fob, token, charm). In some examples, the GPS tracking device may include an RFID mid-range device, or NFC near-range device.

In some examples, one or more occupants may be provided access to the structure via one or more access points 310 through 310-d, or access point 320 through 320-a, or access point 325 automatically based on preconfigured settings, user preferences, system instructions, etc. For example, one or more sensor units 340 may determine that one or more children associated with the structure are within range of the access point 315 (e.g., main door to a home). The one or more sensor units 340 may be a doorbell camera that may capture an image of the field-of-view of the doorbell camera. The captured image may then be processed, e.g., image recognition techniques applied to identify the one or more children. Based on identifying that the one or more children are associated with the structure, the control panel 135-b may transmit instructions to the lock component 330-c to change states (e.g., locked to unlocked). In some examples, the control panel 135-b in communication with one or more of sensor units 340 may track and monitor entry of the one or more children into the structure. Based on the one or more children entering the structure, the control panel 135-b may transmit a notification to a parent's device (e.g., remote computing device 140) indicating that the children have returned home. In some cases, the control panel 135-c may provide continuous notifications of the location of the children within the structure (e.g., zones 305 through 305-d).

The security and automation environment 300 may also support identifying and tracking a visitor or a service personnel at a structure. In some examples, a person associated with a structure of the security and automation environment 300 may provide temporary access code or identifier to a visitor or service personnel. The temporary access code may provide entry to the structure via one or more access points (e.g., access points 310 through 310-d or access point 315). The temporary access code may be a personal identification number (PIN) with a predetermined number of digits (e.g., eight digits). The lock components 330 through 330-e may set and distribute temporary access codes or PINs via the control panel 135-b or independently to devices associated with a visitor or service personnel. In some cases, the lock components 330 through 330-e may rotate temporary access code or PINs amongst one another. In some cases, the lock components 330 through 330-e may be capable of storing a predetermined number of temporary access codes or PINs. For example, the lock components 330 through 330-e may be capable of storing 30 temporary access codes or PINs in a local memory. Temporary access codes and/or PINs may also have predetermined durations and or schedules.

The temporary access codes assigned to each of the lock components 330 through 330-e may also be cleared, i.e., removed from local storage and/or remote storage, when a lock component is removed from an access point. In some cases, when temporary access codes or PINs of the lock components 330 through 330-e is synched with the control panel 135-b or with a security application of the structure via a remote server (e.g., server 155), the temporary access code or PINs may not be assigned or erased locally at the lock component.

The temporary access code may be input by the visitor or service personnel at a lock component of the structure. For example, a visitor or service personnel may enter a digital code at lock component 330-c of the access point 315. In some cases, a person may provide temporary access to a visitor or service personnel via the control panel 135-b or via a personnel device (e.g., local computing device 115 or 120, or a remote computing device 140). In some cases, the control panel 135-b may transmit a message indicating when a visitor or service personnel has entered and/or exited a structure. A service personnel may include, but is not limited to, a babysitter, handymen, electrician, housekeeper, gardener, plumber, etc.

In some examples, the temporary access code may be valid for a predetermined duration and/or schedule. For example, a service personnel may be a housekeeper that visits the structure twice a week (e.g., on Tuesdays and Fridays) at a specific time (e.g., 10:00 am) for two hours to perform services at the structure (e.g., cleaning). The temporary access code for that service personnel therefore may be valid only on Tuesdays and Fridays starting at 10:00 am and expiring at 12:00 pm. In one example, the control panel 135-d may receive sensor data from one or more sensor units 340 at an access point, after detecting presence of a visitor or service personnel based on one or more techniques described above (e.g., image recognition). The one or more sensor units 340 may include a doorbell camera that may capture an image or record video at an access point (e.g., access point 315) based on determining that a temporary access code has been entered at a lock component (e.g., lock component 330-c). The one or more sensor units 340 may transmit the captured image or recorded video to the control panel 135-b. The control panel 135-b may transmit a message to a device associated with an occupant of the structure. The message may identify that a temporary access code has been used, e.g., a time, a day, and an identity of a person associated with the temporary access code. In some examples, the control panel 135-b in communication with one or more sensor units 340 may determine and confirm that a person that entered the temporary access code at a lock component is associated with the temporary access code.

In some examples, the control panel 135-b may provide access to some or all zones 305 through 305-d based on the temporary access code. By providing accesses to some of the zones 305, the security and automation environment 300 may configure a remainder of the zones 305 as safe zones (i.e., zones that are armed, or where access is precluded). For example, in the case a service personnel is not required access to a particular zone (e.g., bedroom), the control panel 135-b may instruct lock component of the particular zone to remain in a locked state. In some cases, the control panel 135-b in communication with one or more sensor units 340 may monitor and track a location of a visitor or service personnel within the structure. The control panel 135-b, in communication with the one or more sensor units 340, may determine when a visitor or service personnel has entered a particular zone, or when a visitor or service personnel has entered and exited the structure or zone. In some examples, the control panel 135-b may send a notification to a person associated with the structure indicating when a visitor or service personnel has entered and/or exited the structure. For example, a parent of a home may be notified at what time a service personnel arrived to the home and when the personnel has exited the home. The control panel 135-b may also transmit instructions to some or all the lock components 330 through 330-e to change states (e.g. from unlocked to locked) based on determining that the visitor of service personnel has exited the structure.

The control panel 135-b may also identify when a visitor or service personnel has remained within the structure for a period that exceeds the allotted authorized duration based on received sensor data from one or more sensor units 340. In some cases, the control panel 135-b may alert a person associate with the structure of the visitors' or service personnel's extended presence at the structure. The control panel 135-*b* may broadcast an alert locally at the structure (via intercom system) alerting the visitor or service personnel that the allotted authorized duration has lapsed. In some cases, the control panel 135-*b* may initiate an alert delay duration. For example, the control panel 135-*b* via an intercom system may alert the visitor or service personnel to exit the structure and broadcast a countdown. The alert may also include a message that security personnel is going to be alerted if the visitor or service personnel has not exited the structure within the alert delay duration. Additionally or alternatively, the control panel 135-*b* may transmit a message to a remote device associated with a person of the structure indicating the exceeded allotted authorized duration of the visitor or service personnel. The message may include an option for the person to establish a communication with a device associated with visitor or service personnel; or to establish a communication with the visitor or service personnel via the control panel 135-*b*. For example, a person associated with the structure may establish a two-way communication link between a remote computing device and the control panel 135-*b*.

The control panel 135-*b* may track one or more temporary access codes for expiration. In some cases, one or more temporary access codes may be stored locally on control panel 135-*b*. Alternatively or additionally, the one or more temporary access codes may be stored remotely on a remote database and be provided via server (e.g., server 155). The control panel 135-*b* may provide an alert message to a device of the person associated with the structure when a temporary access code has expired. The alert message may include options for the person to extend an expiration date, or acknowledge the expiration, or modify the temporary access code (e.g., code combination), etc.

Figure 4:
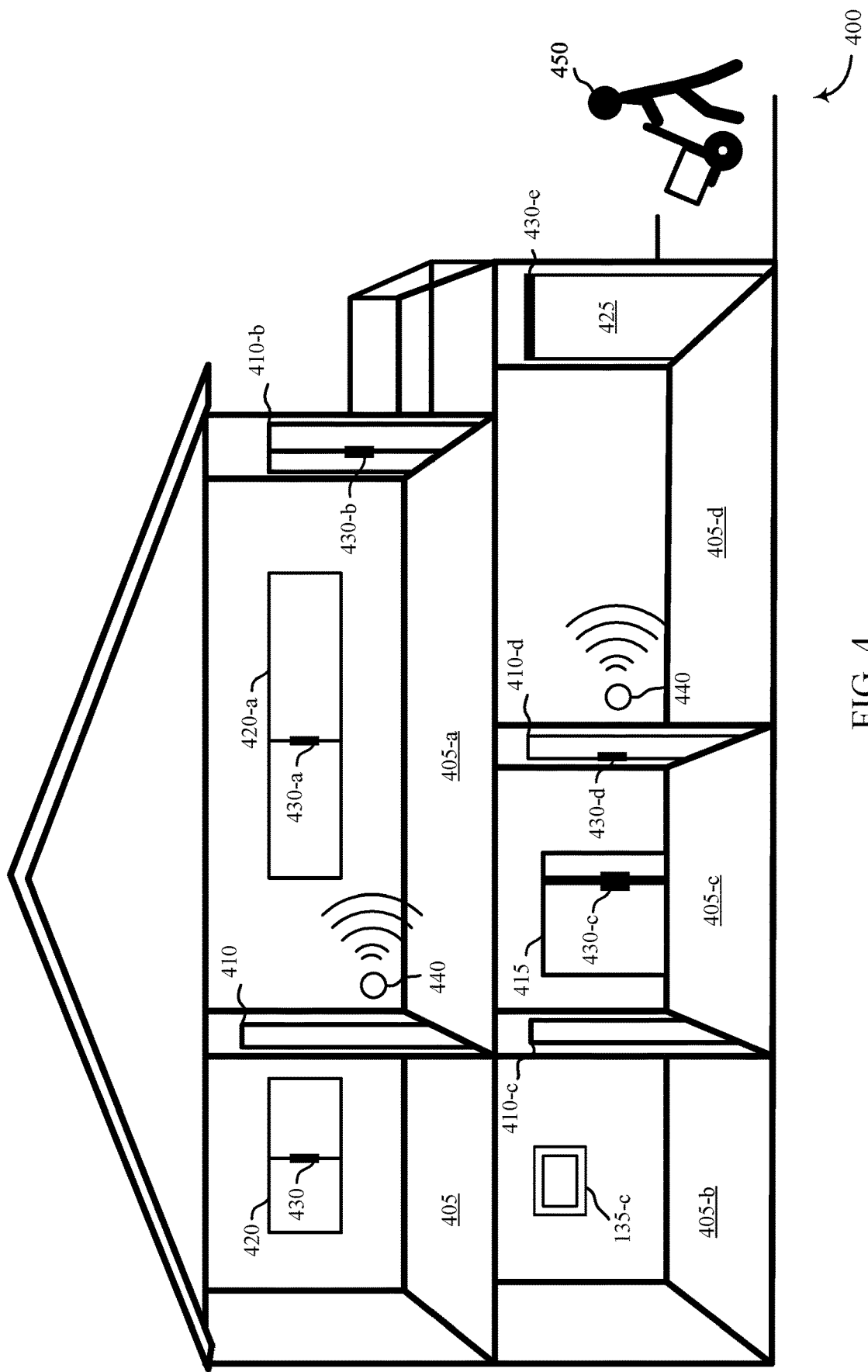
FIG. 4 shows an example diagram relating to an example security and automation environment, in accordance with one or more examples of the present disclosure.

FIG. 4 shows an example diagram relating to an example security and automation environment 400, in accordance with one or more examples of the present disclosure. The security and automation environment 400 may include one or more zones 405, one or more sensor units 440, one or more access points 410 and 220, one or more lock components 430, and a control panel 135-*c*. Each of the zones 405 may be associated with a particular room of a structure. The security and automation environment 400 may, additionally or alternatively, support delivery of packages to a structure.

The control panel 135-*c* may include one or more examples of a control panel as described in FIGS. 1 through 3. The control panel 135-*c* may be a smart home system panel, for example, an interactive panel mounted on a wall of the security and automation environment 400. In some examples, the control panel 135-*c* may be in direct communication via wired or wireless communication links with the one or more sensor units 440, or may receive sensor data from the one or more sensor units 440. The sensor units 440 may be integrated with a wall, door, and/or window for detecting entry and/or exit of a person relative to a zone. The control panel 135-*c* may also be in direct communication via wired or wireless communication links with the one or more lock components 430. The control panel 135-*c* may transmit a signal to one or more lock components 430 to change a state of the lock components 430.

The control panel 135-*c* may receive data associated with a delivery of a package to a structure. For example, the control panel 135-*c* may receive at least one of a delivery company name, delivery person information, a unique code associated with the delivery person, scheduled date of delivery, an expected time of the delivery, tracking number, number of packages, weight of each package, dimensions of each package, or a combination thereof from the local computing device 120, or the remote computing device 140. or the server 155 via network 125, as described in FIG. 1. The control panel 135-*c* may detect a delivery person arriving at an access point of the structure, for example, based on sensor data received from the one or more sensor units 110. The control panel 135-*c* may determine a number of zones inside the structure. Each zone may include a security setting and a barrier (e.g., door, window) having a lock mechanism (e.g., lock component as described in FIGS. 2 through 5). The control panel 135-*c* may determine a delivery zone (e.g., a delivery area) for the package inside or outside the structure. The control panel 135-*c* may perform a function based on the detection of the delivery person and the determined delivery zone. For example, the control panel 135-*c* may secure one or more zones (e.g., lock, monitor, track) and unsecure the delivery zone.

Zone 405 may be a bedroom of a structure (e.g., home) having interior walls, exterior walls, a floor, and a ceiling. In some examples, the zone 405 may include one or more sensors units 440 (not shown) or devices installed, mounted, or integrated with the zone 405. For example, the zone 405 may have a motion sensor installed or mounted on a wall of the zone 405. The motion sensor may detect whether the zone 405 is occupied and report collected sensor data to control panel 135-*c*. In some examples, the zone 405 may include an access point 410 and an access point 420. The access point 410 may be a door or an open entry, and the access point 420 may be a window. The access point 420 may include a lock component 430, while the access point 410 may be absent of a lock component 430, e.g., when access point 410 is an open entry-way.

The security and automation environment 400 may also include a zone 405-*a*. The zone 405-*a* may be a bedroom, living room, etc., that may be separated at least partly from the zone 405 via a wall. The zone 405-*a* may include one or more sensor units 440 installed, mounted, or integrated with zone 405-*a*. For example, the zone 405-*a* may have a camera sensor installed or mounted on a wall. The camera sensor may capture still images or video. The sensor unit 440 of the zone 405-*a* may transmit captured images or video to the control panel 135-*c*. For example, the camera sensor may detect a person in the zone 405-*a* and capture an image and/or record a video of the detected person. The captured image and/or recorded video may be analyzed by the control panel 135-*c* to determine an identity of detected person. For example, the control panel 135-*c* may perform an image or video analytics operation on the image or the video, and identify an object in the image or the video based on the image or video analytics and an image or video database. The image or video database may include a plurality of profiles of individuals. The control panel 135-*c* may compare the identified object to each profile of the plurality of profiles of the individuals, and determine a match between the identified object and at least one profile of the plurality of profiles. The identity of a delivery person may be based on the match. In some examples, the control panel 135-*c* may transmit a notification to a device associated with the security and automation environment 400 based on determining the identity of the detected person. In some examples, the control panel 135-*c* may transmit a notification to a device associated with the security and automation environment 400 based on detecting the person in zone 405-*a*.

The zone 405-*a* may also include an access points 410 and 410-*b*, and an access point 420-*a*. In some examples, the zone 405 and zone 405-a may share the access point 410. The access points 420-a and 410-b may include a lock components 430-a and 430-b that may change a state of the access points. For example, the access point 420-a may be a window and the lock component 430-a may be a locking mechanism that may lock or unlock the window. The access point 410-b may be a sliding door to a patio, and the lock component 430-b may provide access to the patio. In some cases, the lock component 430-a and the lock component 430-b may adjust a state based on sensor data collected and identified by the sensor unit 440 of the zone 405-a. Alternatively, the lock component 430-a and the lock component 430-b may change a state based on instructions received from the control panel 135-c. For example, when a camera sensor detects a person in zone 405-a, the control panel 135-c may transmit instructions to the lock component 430-a and the lock component 430-b to change a state based on the detected person and/or the determined identity of the person. For instance, if a child is detected in the zone 405-a, the access point 410-b that leads to a patio may be classified in the security and automation environment 400 as a restricted zone for children. For example, after the control panel 135-c receives sensor data (e.g., captured images, recorded video, motion, audio data), it may analyze the sensor data and determine that the detected person is a child. As a result, the control panel 135-c may transmit instructions to the lock component 430-b to change a state from unlocked to locked.

Zone 405-b may also include interior walls, exterior walls, a floor, and a ceiling. In some examples, the floor of the zone 405-b may include one or more sensors integrated with it. The zone 405-b may include an access point 410-c, which may be an open entry access point with no lock component. The zone 405-b may include one or more sensor units 240 to monitor one or more conditions of the zone 405-b. For example, the one or more sensor units 240 may monitor a temperature of zone 405-b, motion at zone 405-b, sound at zone 405-b, light at zone 405-b, etc. The zone 405-c may include interior walls, exterior walls, a floor, and a ceiling. Additionally, the zone 405-c may include one or more sensor units 440. The one or more sensor units 440 of the zone 405-c may be installed, mounted, or integrated within the zone 405-c. The zone 405-c may include an access point 410-c that may be mutual with the zone 405-b. The zone 405-c may also include an access point 410-d shared with zone 405-d.

The zone 405-d may include interior walls, exterior walls, a floor and a ceiling. Additionally, the zone 405-d may include one or more sensor units 440, an access point 410-d that may be shared with the zone 405-c. The zone 405-d may also include an access point 410-e that may be a main entry point to the structure. The access point 410-e may include a lock component 430-d. The one or more sensor units 440 of the zone 405-d may be installed, mounted, or integrated within the zone 405-d. For example, the lock component 430-d may be a doorbell camera. The control panel 135-c may be located within the zone 405-d. In some cases, the control panel 135-c may receive information regarding a delivery of a package to the structure of the security and automation environment 400. The information received may include a delivery company name, delivery person information (e.g., delivery person name, photo ID, work ID, etc.), a unique code (e.g., barcode, QR code, etc.), a unique code associated with the delivery person, scheduled date of delivery, an expected time of delivery (e.g., a window of time), tracking number, number of packages, weight of each package, dimensions of each package, etc.

In some cases, the control panel 135-c may be granted access to a personal account associated with a delivery company. Thus, in some cases, the control panel 135-c may query delivery information by accessing the personal account, from which the control panel 135-c may receive notifications of expected deliveries, real-time updates to the delivery information, real-time notices of a delivery person's arrival at the structure, or a combination thereof. In some cases, the control panel 135-c may generate a notification based on the received information regarding a delivery of a package to the structure.

The control panel 135-c may also provide instructions to a delivery person based on a preconfigured setting. For example, a person associated with the structure may provide authorization to delivery personnel to drop off packages within a particular zone of a structure. In some cases, the control panel 135-c in communication with one or more sensor units 440 may detect a delivery person 450 arriving at the structure. The control panel 135-c in communication with one or more sensor units 430 may determine a location of a delivery vehicle. The location of the delivery vehicle may be determined by a location device on the delivery vehicle such as a GPS tracker. Additionally or alternatively, the delivery person 450 may provide information regarding his or her location (e.g., present delivery location, next delivery location). In some examples, based on geo-location, a state of a lock component associated with an access point may change when the delivery person 450 is within a particular range. For example, the lock component 430-e may change a state from locked to unlocked based on a detected range of the delivery person 450 to the access point 425.

In some examples, the control panel 135-c may receive information indicating that the delivery vehicle is at and/or within a predefined distance of the structure. The control panel 135-c may receive sensor data from one or more sensor units 440 located outside of the structure that may be configured to recognize a delivery vehicle, a delivery uniform, a delivery company logo, etc. Thus, in some cases, upon receiving information indicating the delivery vehicle is at or near the structure, the control panel 135-c may scan captured images to detect a delivery vehicle and/or delivery person. As discussed above, the delivery person 450 may receive instructions at a wireless device via the control panel 135-c to drop of a package in the zone 405-d. In this examples, the zone 405-d may be a garage of a home. One or more sensor units 440 may detect the delivery person 450 outside of the access point 425. The one or more sensor units 440 may capture sensor data such as, but not limited to, an image, record a video, capture audio data, monitor motion, etc., associated with delivery person 450. The captured sensor data may then be transmitted to the control panel 135-c to determine and validate an identity of the delivery person 450.

After determining and validating the identity of the delivery person 450, the control panel 135-c may determine a state of lock components 430 through 430-e. Based on determining the state of the lock components 430 through 430-e and validating the delivery person 450, the control panel 135-c may transmit instruction to the lock components 430 through 430-d to change to a lock state. Additionally, the control panel 135-c may transmit instructions to lock component 430-e to change to an unlock state. In the example, that access point 425 is a garage door, the lock component 430-e may be a garage door actuator that may open the garage based on receiving the instruction from the control panel 135-c or a sensor unit 440. In this example, the delivery person 450 may delivery a package to an authorized drop-off location (e.g., zone 405-*d*), while remaining zones 405 through 405-*c* remain secured (i.e., safe zones). In some cases, the control panel 135-*c* may determine an occupancy of the structure, and identify a zone associated with the determined occupancy. The control panel 135-*c*, as a result, may secure the zone with the determined occupancy, for example, by changing a state of a lock component associated with the zone.

For example, the control panel 135-*c* and one or more sensor units 440 may detect an arrival of the delivery person 450. After validating the delivery person 450, the control panel 135-*c* may transmit a command to the lock component 430-*e* to change states (e.g., the access point 425 may be a garage and lock component 430-*e* may be a garage door actuator). In some cases, before granting access to the delivery person 450, the control panel 135-*c* may verify that one or more of the lock components 430 through 430-*d* associated with the zones 405 through 405-*c* are in a locked state. For example, before granting access to the delivery person 450, the control panel 135-*c* may verify that lock component 430-*d* of the access point 410-*d* for the zone 405-*c*, and the lock component 430-*c* of the access point 415 are in a locked state. In further examples, an exterior wall of the zone 450-*d* may include another access point (e.g., man door or pass door, a hinged door) that provides an additional access to the 405-*d* from the outside. Thus, in some cases, the delivery person 450 may be granted access to zone 405-*d* by unlocking a man door or pass door on zone 405-*d*.

In some cases, the delivery person 450 may ring a doorbell and/or knock on the door (e.g., access point 415 or access point 425) of the structure and/or trigger a motion detector. Upon detecting the delivery person 450 at the door, a camera of lock component 430-*c* or 430-*e* may capture a photo and/or video image of delivery person 450. The control panel 135-*c* may compare the captured image to an image of the delivery person 450 provided by the delivery company (e.g., a photo ID of the delivery person). In some cases, an automated system (e.g., a prerecorded message, a voice simulated message, etc.) of lock component 430-*c* or lock component 430-*e* may request that the delivery person 450 stare into a camera in order to capture an image with a similar viewpoint as that of an image of the delivery person 450 provided by the delivery company.

In some examples, the delivery person 450 may be instructed to place an identification card in relation to a camera of lock component 430. The identification card may include a photo ID of the delivery person 450, a name of the delivery person 450, a company name, a company logo, a unique code (e.g., barcode, QR code, etc.), short-range communication capabilities (e.g., radio frequency ID (RFID), near-field communication (NFC), etc.), and the like. Upon receiving data from and/or capturing an image of the identification card, the lock component 430 or the control panel 135-*c* may use any combination of the captured information (e.g., photo ID, name, barcode, RFID, etc.) to verify the identity of the delivery person 450. In some cases, such as when the delivery person 450 arrives outside an expected period of time, additional verification may be requested.

In some examples, before granting the delivery person 450 access to a delivery area (i.e., zone 405-*d*), the control panel 135-*c* may request the delivery company verify the location of the delivery person 450. For example, the control panel 135-*c* may query a server of the delivery company (e.g., server 155) to determine the current location of the delivery vehicle associated with the expected delivery. Additionally, or alternatively, before granting the delivery person 450 access to a delivery area, the control panel 135-*c* may request that a person associated with structure approve granting the delivery person 450 access to the delivery location (i.e., zone 405-*d*). For example, the person may receive a real-time notification regarding the arrival of the delivery person 450 to the structure.

The person may receive a live audio and/or photo and/or video image feed of the delivery in progress. In some cases, the person may be enabled to communicate with the delivery person 450 in real-time (e.g., between the person's mobile device and communication component in communication with a lock component, via a network). In some examples, control panel 135-*c* may request that the delivery person 450 enter information associated with the package such as a tracking number and/or an employee identification code. In some cases, the control panel 135-*c* may determine that the information is sent and/or received by a computing machine owned by the delivery company. For example, the security and automation environment 400 may determine that the information entered by the delivery person 450 is verified and registered by a secure server owned by the delivery company. Upon verifying that the information is entered and verified by the delivery company, temporary access to the delivery area (e.g., zone 450-*d*) may be granted.

In some cases, a doorbell camera may scan a barcode on a package. In some examples, for instance lock component 430-*c* of access point 415 (e.g., a main door) may include a doorbell camera that may capture an image of barcode on a package and transmit the captured image to the control panel 135-*c*. The control panel 135-*c* may then evaluate the captured image of the barcode to determine whether the package is expected. If the control panel 135-*c* determine that the barcode is associated with an expected package and/or delivery period, the control panel 135-*c* may transmit instructions to the lock component 430-*c* to change a state (e.g., locked to unlocked).

The control panel 135-*c* may also transmit a temporary access code to a device associated with the delivery person 450. For example, upon detecting the arrival and/or verifying the identity of the delivery person 450, the control panel 135-*c* may transmit a temporary access code to a device of the delivery person 450 (e.g., smart phone, computing device, near-field communication device). The temporary access code may include a temporary electronic key configured to unlock an access point, a temporary frequency code configured to open an access point wirelessly, or a temporary keypad code configured to open an access point via a keypad outside the access point.

The temporary access code may be configured to operate only during a predetermined time period, upon detecting the arrival of the delivery person 450, and/or upon authenticating the identity of the delivery person 450. In some examples, a lock component (e.g., the lock components 430 through 430-*e*) of an access point may include a display for entering a digital code. Alternatively, a lock component of an access point may include an additional manual locking mechanism in addition to an automatic locking mechanism controlled by the control panel 135-*c* and each of the lock components 430 through 430-*e* individually. For example, a person associated with the structure of the security and automation environment 400 may provide a temporary code to the delivery person 450. The delivery person 450 may enter the temporary code at the lock component 430-*e*, for example, and be given access to the zone 405-*d* to deliver a package, while access to a remainder of the zones is precluded. This may provide a safe zone for one or more occupants of the structure when a service personnel (e.g., the delivery person 450) is at the structure.

In some examples, the control panel 135-c may manage a delivery of a package once the arrival of an expected delivery is verified (e.g., verifying delivery information, identity of delivery person). In some cases, the control panel 135-c may provide instructions to the delivery person 450 regarding where to place a package at the structure. The instructions may be provided to the delivery person 450 upon detecting the delivery person 450 arriving at the structure. For example, the delivery person 450 may knock on an access point, for example, knock or ring a doorbell of the structure. Upon detecting the delivery person 450 at the door, a communication device (e.g., a speaker at the door that is part of an intercom system) may provide instructions to the delivery person 450. The instructions may include pre-recorded messages, digital text-to-speech messages, etc. For example, the control panel 135-c may transmit a recorded message to one of the lock components 430 through 430-e to be broadcasted to the delivery person 450. The recorded message may include instructions how and where to deliver the package. In some examples, the control panel 135-c may provide instructions to the delivery person 450 via a data communication. For example, the delivery person 450 may receive an email, a text message, etc. In some cases, the delivery person 450 may be notified that the process of placing the delivery at the designated delivery location will be recorded.

In some examples, the control panel 135-c in communication with one or more sensor units 440 may identify a designated drop-off location for a package, in the zone 405-d. For example, one or more sensor units 440 may detect a marker placed by a person at a designated location in the zone 405-d. Upon determining the designated location, the control panel 135-c, in communication with one or more sensor units 440 (e.g., a camera), may be configured to monitor the designated delivery location. In some cases, the designated location may include a base integrated with one or more sensor units 440 (e.g., pressure sensors) that may detect when a package is dropped off. In other cases, the one or more sensor units 440 may be a camera that may perform image and video analytics to determine whether a package has been dropped off in a designated location of zone 405-d. Additionally, the control panel 135-c, in conjunction with a camera (e.g., one or more sensor units 440), may capture a photo and/or video image of the delivery area (e.g., zone 405-d). The control panel 135-c may perform image analysis on a captured image to or video images to determine whether the delivery person 450 has delivered the package to the zone 405-d. In some cases, the control panel 135-c may transmit and/or broadcast in real-time the captured photo and/or video images of the zone 450-d to a computing device of a person associated with the structure.

In some examples, the control panel 135-c and one or more sensor units 440 may detect an arrival of the delivery person 450. After validating the delivery person 450, the control panel 135-c may determine an occupancy associated with the structure. For example, the control panel 135-c may receive sensor data from one or more sensor units 440 (e.g., from motion sensors, heat sensors, sound sensors, light sensors) indicating a detected individual within the structure. The control panel 135-c may also determine whether the detected individual is a minor or an adult. For example, the control panel 135-c may determine that detected individual is a child based on performing one or more recognition techniques using the received sensor data. One recognition technique may include, capturing an image of the detected individual and comparing the image to a database of images of persons associated with the structure. In some examples, a recognition technique may include monitoring a behavior or characteristic of the detected person, e.g., motion sequence, audio data, breathing pattern, height detection, etc., and identifying the individual based on the behavior.

When the control panel 135-c, in communication with the one or more sensor units 440, determines that an occupancy exists and is associated with a minor with no adults present in the structure, the control panel 135-c may transmit instructions to a device associated with the delivery person 450. For example, the instructions may indicate to the delivery person 450 to deliver the package at a location outside the structure, e.g., on a front patio, or in a backyard, or some other designated location exterior to the structure. As a result, lock components 430 through 430-e may remain in a lock state. Alternatively, the control panel 135-c may provide access to a single zone of the structure, in the case that occupancy is detected in the structure (e.g., a minor being home). In some examples, the control panel 135-c may transmit instructions to at least one lock component of an access point to change to an unlock state, while transmitting instructions to other lock components to remain in a lock state based on the occupancy, which may create a safe zone for the occupant.

Additionally, an adult associated with the structure may be notified of delivery person 450 presence at the structure. For example, the control panel 135-c may transmit a message to a device of a person (e.g., parent) associated with the structure. The message may include a captured image of the delivery person 450, an option for the person to initiate one or more functions of the security and automation environment 400, etc. In some cases, the control panel 135-c may receive feedback from the person based on the transmitted message. The feedback may be an instruction for the delivery person 450 to deliver the package at a designated location. In some cases, the feedback may include instructions for the control panel 135-c to maintain a lock state for the lock components 430 associated with the structure. Alternatively, in some cases, the control panel 135-c may determine an occupancy and transmit instructions to a device associated with the delivery person 450, regardless if the occupancy is associated with an adult or minor. In this case, the transmitted instructions may instruct the delivery person 450 to perform an action prior to delivering the package, e.g., ring a doorbell or knock on a door.

In some examples, the delivery person 450 may provide multi-factor authentication at the structure. For example, a multi-factor authentication may include a device carried by the delivery person 450 transmitting geo-location information to control panel 135-c. Control panel 135-c may confirm that the delivery person 450 is expected for delivery of a package at the corresponding day and time. For example, the control panel 135-c may receive information from a server associated with a delivery company of the delivery person 450, and compare the received information with the geo-location information and additional delivery data. In some examples, the control panel 135-c may transmit a message to the device of the delivery person 450 to perform an action. In some examples, the action may be performed a number of times, a frequency of the action, a duration of the action, or a combination thereof. For example, the delivery person 450 may be instructed to double-press a doorbell at the structure. In some examples, the delivery person 450 may be instructed to have a frequency delay between the action. For example, the delivery person 450 may press the doorbell once and then wait a duration (e.g., 1 second) before pressing the doorbell again. In other words, the frequency may be associated with the number of times the actions is performed during a duration. The delivery person 450 may also be instructed to hold the doorbell for a predetermined duration (e.g., 3 seconds). As a result, the geo-location information transmitted by the device of the delivery person 450 and the double-press of the doorbell may act as a multi-factor authentication. In some cases, the control panel 135-*c* may initiate a secure delivery operation based on receiving and identifying the multi-factor authentication. The secure delivery operation may include instructing the delivery person 450 to drop of the package at a designated location and/or transmit instructions to one or more lock components to change a state (e.g., lock to unlock).

In some cases, the control panel 135-*c* may provide a temporary code to change a state of a lock component. For example, the control panel 135-*c* may provide instructions to the delivery person 450 to deliver a package in zone 405-*d*. Zone 405-*d* may be a garage, and access point 425 may be a garage door. In some cases, lock component 430-*e* may be a garage lock component that may be in communication with a garage door controller. The delivery person 450 may enter the temporary code at lock component 430-*e*, which may trigger the secure delivery operation that may include instructing the delivery person 450 to deliver the package at a designated location (e.g., zone 405-*d* or an area within zone 405-*d*) and/or transmit instructions to lock component 410-*d* to change a state (e.g., unlock to lock) and to lock component 430-*e* to also change a state (e.g., lock to unlock). In the case, access point 425 is a garage, lock component 430-*e* may trigger a garage door controller to open the garage based on the changing states of lock component 410-*d* and lock component 430-*e*.

In some cases, the control panel 135-*c* in communication with one or more sensor units 440 may determine if the delivery person 450 places the package inside a designated delivery area in zone 405-*d*. Upon determining where the delivery person 450 places the package inside the designated delivery area, the control panel 135-*c* in communication with one or more sensor units 440 may determine a proximity or a difference between the designated delivery location and the actual location where the package is delivered satisfies a predetermined threshold. Upon determining the proximity and/or the difference between the designated delivery location and the actual location where the package is delivered satisfies a predetermined threshold, the control panel 135-*c* may prompt the delivery person 450 to adjust the location of the package placement. For example, the control panel 135-*c* may provide an audio feedback (e.g., play a recorded voice instruction, digitally communicate a text-to-speech instruction, etc.), visual feedback (e.g., a flashing light, a certain color of light) via one or more sensor units 440 of zone 405-*d*.

In some cases, one or more sensor units 440 of zone 405—may provide a continuous visual feedback while the delivery person 450 is delivering the package. For example, upon entering zone 405-*d*, a light emitting device may shine a red light on a surface of the delivery area until the package is placed within a predetermined distance of the designated delivery location. Upon detecting the delivery person 450 placing the package within the predetermined distance of the designated delivery location, the light emitting device may switch from emitting the red light to a green light. Additionally, or alternatively, audio feedback may indicate proper placement of the package at the designated delivery location in zone 405-*d*.

In some examples, control panel 135-*c* in communication with one or more sensor units 440 may, after granting access to zone 405-*d*, monitor zone 405-*d*. Monitoring zone 450-*d* may include determining that the delivery person 450 delivered the package (e.g., in a designated area of zone 405-*d*), and may also determine that delivery person 450 has exited zone 405-*d* after delivering the package. Control panel 135-*c* may, as a result, transmit a notification to a device associated with person of the structure notifying him or her of the event (i.e., delivery of the package).

Figure 5A:
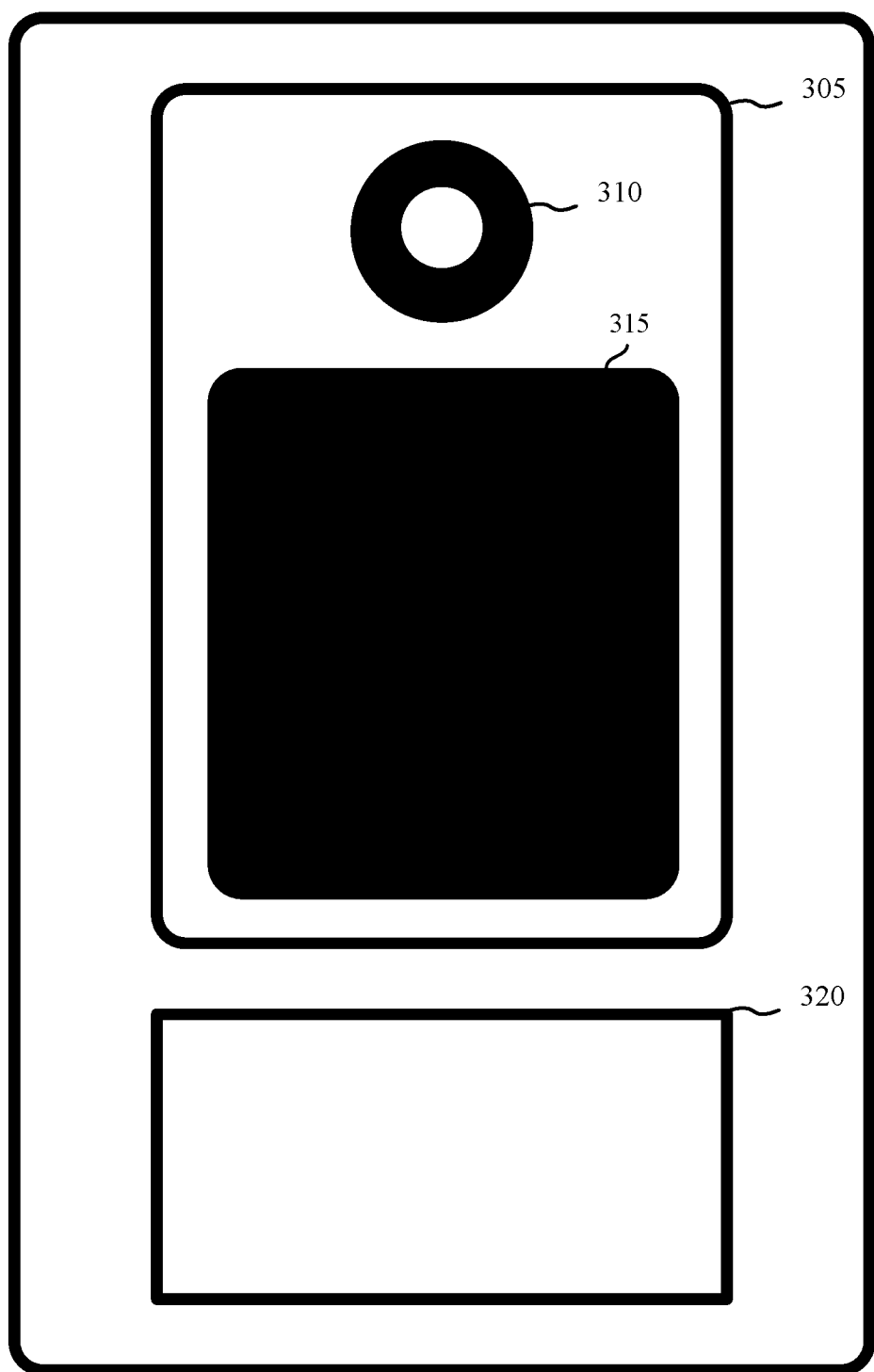
FIGS. 5A, 5B, and 5C show example diagrams relating to an example lock component, in accordance with one or more examples of the present disclosure.
Figure 5B:
Figure 5C:
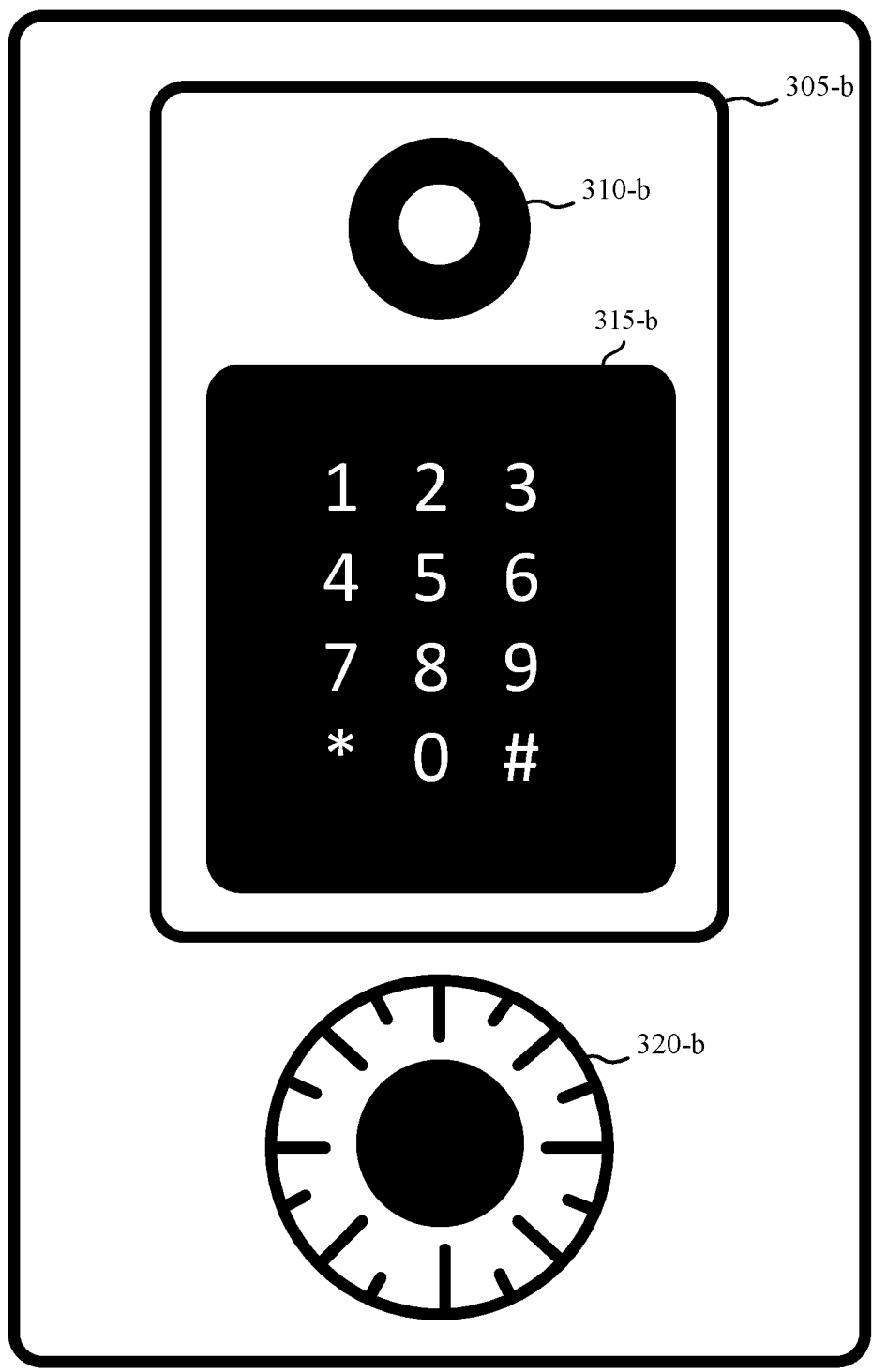

FIGS. 5A-5C show an example diagram relating to an example lock component 500, in accordance with one or more examples of the present disclosure. FIG. 5A shows an example diagram relating to an example lock component 500, in accordance with one or more examples of the present disclosure. The lock component 500 may include a first security portion 305 and a second security portion 320. In some examples, lock component 500 may be integrated with an access point. Lock component 500 may be one or more examples, of lock component as described with reference to FIGS. 2-4.

The first security portion 305 may include a doorbell camera 310 and an authorization interface 315. The doorbell camera 310 may also be integrated with one or more sensors and/or a microphone. In some examples, the doorbell camera 310 may activate a state feature of the lock component 500, prior to physical interaction with the lock component 500. Doorbell camera 310 may be enabled to detect motion. In some examples, the doorbell camera may detect motion occurring within a pre-determined distance from lock component 500. The doorbell camera 310 may be additionally enabled to differentiate between environmental motion such as a passing vehicle, an animal, or wind and the movement of a person. In some examples, the doorbell camera may activate a state of the lock component (e.g., lock or unlock) based on detecting.

The doorbell camera 310 may identify a person within a range of lock component 500. For example, doorbell camera 310 may capture images or video of one or more persons at an entry to a structure. The doorbell camera 310 may then identify the person based on performing one or more image recognition techniques or video analytics, as discussed elsewhere herein. The authorization interface 315, in some examples, may be part of bio-recognition. For example, any one of motion detection, facial recognition, light contrast analysis, voice recognition, and image analysis may be used to identify the person.

Alternatively, authorization interface 315 may act as a backup power source for lock component 500. For example, authorization interface 315 may be a solar panel that may storage energy captured via light emitted photons. In some examples, authorization interface 315 may store energy from operation of lock component 500. For example, in the case when lock component 500 includes a door knob, authorization interface 315 may store energy from the operation of the door knob. Additionally or alternatively, authorization interface 315 may include a mechanical recharging component (not shown) that may be associated with a pump-up button or a recharging crank. As a result, when the lock component 500 is being operated on, the pump-up button or the recharging crank may store and/or generate some reverse power that may be captured by authorization interface 315.

In some examples, authorization interface 315 may recharge a power source (not shown) of lock component 500 based on power delivered from a mobile device. For example, authorization interface 315 may include a universal serial bus (USB) port. A person proximate to the lock component 500, may connect a mobile device using the USB port of authorization interface 315. In some examples, the mobile device may transmit authentication information of the person, in addition to charging a power source of lock component 500 using the USB port. In some examples, lock component may disable one or more functions of first security portion 305 based on a power level of a power source associated with lock component 500.

The second security portion 320 may include a secondary authorization interface (not shown). For example, the second security portion 320 may be a keypad, key lock, dial. For example, second security portion 320 may be a padlock, deadbolt lock, knob lock, lever handle lock, cam locks, rim/mortise locks, wall/door mounted lock, a rim latch lock, an automatic dialer, or a manual dialer, among others.

FIG. 5B shows an example diagram relating to an example lock component 500, in accordance with one or more examples of the present disclosure. The lock component 500 may include a first security portion 305-*a* and a second security portion 320-*a*. In some examples, lock component 500 may be integrated with an access point. Lock component 500 may be one or more examples, of lock component as described with reference to FIGS. 2-5A. As discussed above, The first security portion 305-*a* may include a doorbell camera 310-*a* and an authorization interface 315-*a*. The doorbell camera 310-*a* may also be integrated with one or more sensors and/or a microphone. In some examples, the doorbell camera 310-*a* may activate a state feature of the lock component 500, prior to physical interaction with the lock component 500.

Authorization interface 315-*a* may receive biometric information for identifying a person at lock component 500. For example, authorization interface 315-*a* may receive a fingerprint input from a person. Authorization interface 315-*a* may analyze the fingerprint for matching purposes. The analysis may include a comparison of several features of the fingerprint pattern. For example, the fingerprint analysis may include examination of aggregate characteristics of ridges, and minutia points, which are unique features found within the patterns. In some cases, authorization interface 315-*a* may compare the fingerprint analysis results with a database of stored fingerprint characteristics of associated with the lock component 500. For example, the fingerprint database may be associated with one or more fingerprints of personnel (e.g., parents, children, visitors) associated with a home. Authorization interface 315-*a* may confirm an identity of the person associated with the received fingerprint input. In some examples, the authorization interface 315-*a* may transmit instructions to lock component 500 to modify a state of lock component based on the confirmed identity.

A person proximate to the lock component 500 may also change a state of lock component 500 based on operating the second security portion 320-*a*. As discussed with reference to FIG. 5A, second security portion 320-*a* may be a keypad, key lock, dial. For example, second security portion 320-*b* may be a padlock, deadbolt lock, knob lock, lever handle lock, cam locks, rim/mortise locks, wall/door mounted lock, a rim latch lock, an automatic dialer, or a manual dialer, among others. In some examples, the person proximate to the lock component 500 may be enter a temporary access code via second security portion 320-*a*. Based on the received temporary access code, the lock component 500 may change a state (e.g., locked to unlocked).

FIG. 5C shows an example diagram relating to an example lock component 500, in accordance with one or more examples of the present disclosure. The lock component 500 may include a first security portion 305-*b* and a second security portion 320-*b*. In some examples, lock component 500 may be integrated with an access point. Lock component 500 may be one or more examples, of lock component as described with reference to FIGS. 2-5B. As discussed above, The first security portion 305-*b* may include a doorbell camera 310-*b* and an authorization interface 315-*b*. The doorbell camera 310-*b* may also be integrated with one or more sensors and/or a microphone. In some examples, the doorbell camera 310-*b* may activate a state feature of the lock component 500, prior to physical interaction with the lock component 500.

Authorization interface 315-*b* may receive a digital input for identifying a person at lock component 500. For example, authorization interface 315-*b* may receive a temporary access code or PIN input from a person. Authorization interface 315-*b* may analyze the temporary access code or PIN for matching purposes. The analysis may include a comparison of the temporary access code or PIN to database of temporary access codes or PINs associated with lock component 500. Authorization interface 315-*b* may confirm an identity of the person associated with the received temporary access code or PIN input. In some examples, the authorization interface 315-*a* may transmit instructions to lock component 500 to modify a state of lock component based on the confirmed identity.

A person proximate to the lock component 500 may also change a state of lock component 500 based on operating the second security portion 320-*b*. As discussed with reference to FIGS. 5A and 5B, second security portion 320-*b* may be a keypad, key lock, dial. For example, second security portion 320-*b* may be a padlock, deadbolt lock, knob lock, lever handle lock, cam locks, rim/mortise locks, wall/door mounted lock, a rim latch lock, an automatic dialer, or a manual dialer, among others. In some examples, the person proximate to the lock component 500 may be enter a temporary access code via second security portion 320-*b*. Based on the received temporary access code, the lock component 500 may change a state (e.g., locked to unlocked).

Figure 6:
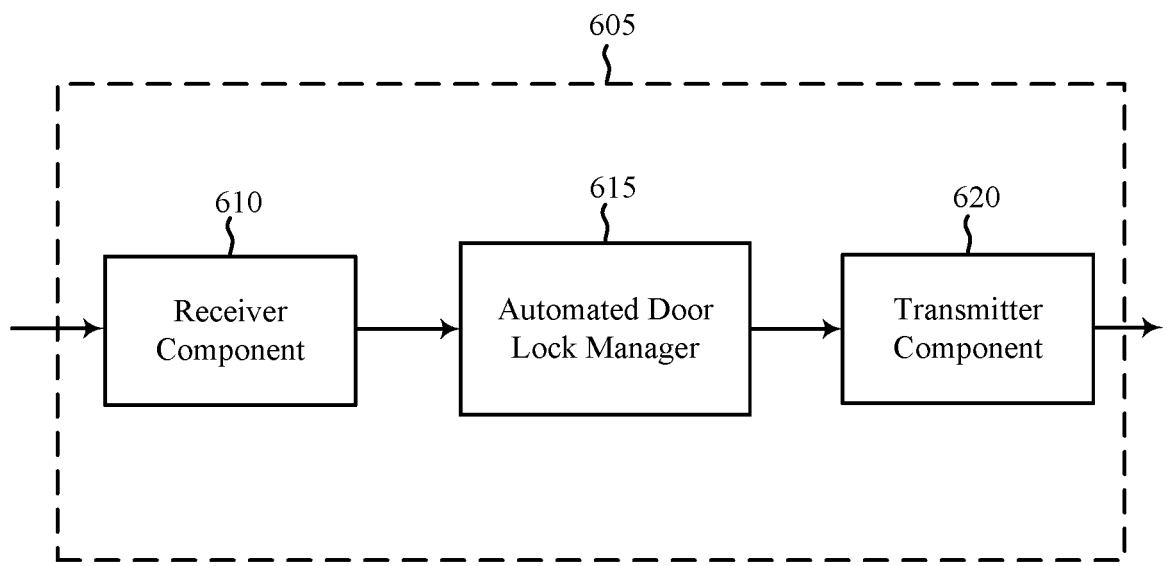
FIG. 6 shows a block diagram of an example apparatus relating to a security and automation system, in accordance with one or more examples of the present disclosure.

FIG. 6 shows a block diagram 600 of an example apparatus 605 relating to a security and automation system, in accordance with one or more examples of the present disclosure. The apparatus 605 may be an example of one or more examples of a control panel 135 described with reference to FIG. 1. The apparatus 605 may be an example of one or more examples of a lock component 505 described with reference to FIGS. 5A-5C. The apparatus 605 may include a receiver component 610, an automated door lock manager 615, and/or a transmitter component 620. The apparatus 605 may also be or include a processor. Each of these components or modules may be in communication with each other—directly and/or indirectly.

In one example, where apparatus 605 is a control panel, apparatus 605 may be a control panel in the form of an interactive home automation system display. In some examples, apparatus 605 may be a local computing device 120 such as a personal computer or portable electronic device (e.g., smart phone, smart watch, tablet computer). In some examples, apparatus 605 may be coupled to at least one sensor unit 110. The components of the apparatus 605 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver component 610 may receive information such as packets, user data, and/or control information associated with various information channels (e.g., control channels, data channels, etc.). In some examples, the receiver component 610 may be configured to receive instructions at the apparatus 605. In one example, the receiver component 610 may be configured to receive an instruction from local computing device 120 and/or remote computing device 140. In some examples, the received instruction may be in the form of a verbal command and/or a tactile input. In further examples, the receiver component 610 may receive identification information, location information and/or authentication credentials from the sensor units 110, local computing device 120, remote computing device 140, and/or server 155. In some examples, information (e.g., authentication credentials, location information) may be passed on to the automated door lock manager 615, and to other components of the apparatus 605.

The automated door lock manager 615 may receive sensor data associated with at least one sensor of the security and/or automation system; analyze the received sensor data; and initiate a function of the security and/or automation system based on the analyzing.

The transmitter component 620 may transmit the one or more signals received from other components of the apparatus 605. The transmitter component 620 may transmit information collected by sensors such as actions or behaviors, times of entry or exits associated with a structure and/or property, and the like. In some examples, the transmitter component 620 may be collocated with the receiver component 610 in a transceiver module.

Figure 7:
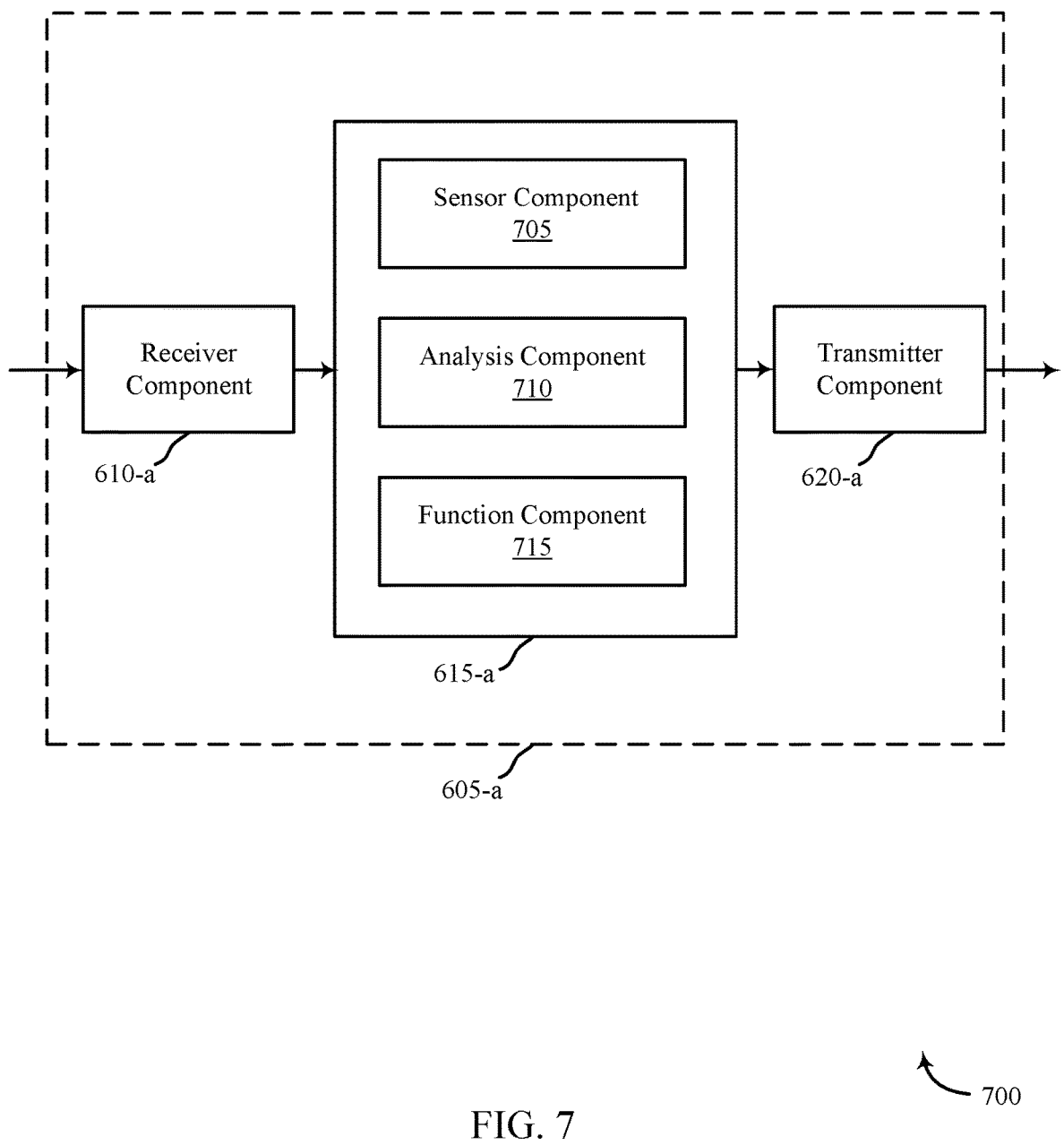
FIG. 7 shows a block diagram of an example apparatus relating to a security and automation system, in accordance with one or more examples of the present disclosure.

FIG. 7 shows a block diagram 700 of an example apparatus 605-a relating to a security and automation system, in accordance with one or more examples of the present disclosure. The apparatus 605-a may be an example of one or more examples of a control panel 135 described with reference to FIG. 1. The apparatus 605-a may be an example of one or more examples of a lock component 505 described with reference to FIGS. 5A-5C. The apparatus 605-a may include a receiver component 610-a, an automated door lock manager 615-a, and/or a transmitter component 620-a. The apparatus 605-a may also be or include a processor. In some examples, apparatus 605-a may be an example of one or more examples of apparatus 605 described with reference to FIG. 6. Each of these components or modules may be in communication with each other—directly and/or indirectly.

In some examples, where apparatus 605-a is a control panel, apparatus 605-a may be a control panel in the form of an interactive home automation system display. In some examples, apparatus 605-a may be a local computing device 120 such as a personal computer or portable electronic device (e.g., smart phone, smart watch, tablet computer).

In some examples, the automated door lock manager 615-a, may include a sensor component 705, an analysis component 710, and a function component 715. In some examples, the automated door lock manager 615-a may be an examples of one or more examples of automated door lock manager 615 described with reference to FIG. 6. The components of the apparatus 605-a may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver component 610-a may receive information such as packets, user data, and/or control information associated with various information channels (e.g., control channels, data channels, etc.). In some examples, the receiver component 610-a may be configured to receive instructions at the apparatus 605-a. In one example, the receiver component 610-a may be configured to receive an instruction from local computing device 120 and/or remote computing device 140. In some examples, the received instruction may be in the form of a verbal command and/or a tactile input. In further examples, the receiver component 610-a may receive identification information, location information and/or authentication credentials from the sensor units 110, local computing device 120, remote computing device 140, and/or server 155. In some examples, information (e.g., authentication credentials, location information) may be passed on to the automated door lock manager 615-a, and to other components of the apparatus 605-a.

In some examples, the sensor component 705 may identify an event associated with an access point of the structure based on the sensor data. In some examples, the sensor data comprises data received from: a sensor in contact with an access point, a sensor in or in contact with a doorbell camera, a sensor associated with an exterior of the structure, a sensor within the structure, a camera, a motion sensor, a control panel, or a combination thereof. In some examples, the sensor data may sensor data is associated with a lock component at an access point, wherein analyzing the received sensor data comprises determining that the sensor data indicates a person has interacted with an interior side of the lock at the access point. In some examples, the sensor component 705 may determine that that the identified person passed through the access point based on the received sensor data. In some examples, the sensor component 705 may determine that the sensor data indicates a location of the person relative to the access point. In some examples, the sensor component 705 may determine that the sensor data indicates a location of the person relative to the access point. In some examples, the analysis component 710 may determine that the event is an exit event associated with a person of the structure.

In some examples, the function component 715 may adjust the state of the lock component is based on the exit event. In some examples, the function component 715 may initiate the function autonomous of a user input received at a control panel, a doorbell camera, and/or a lock at an access point. In some examples, the function component 715 may suspend an alarm event based on determining that the sensor data indicates the person has interacted with the interior side of the lock component at the access point.

In some examples, the function component 715 may notify the person regarding a state of the lock component at the access point. In some examples, the function component 715 may notify the person before the state of the lock component is modified based on an interaction with the interior side of the lock at the access point. In some examples, the function component 715 may notify the person after the state of the lock component is modified and before an alarm event is triggered based on an interaction with the interior side of the lock component at the access point. In some examples, the function component 715 may determine that the sensor data indicates a location of the person relative to the access point. In some examples, the function component 715 may broadcast a message regarding a state of a lock component associated with the access point, or an alarm condition associated with the security and/or automation system, or a combination thereof.

The transmitter component 620-*a* may transmit the one or more signals received from other components of the apparatus 605-*a*. The transmitter component 620-*a* may transmit information collected by sensors such as actions or behaviors, times of entry or exits associated with a structure and/or a property, and the like. In some examples, the transmitter component 620-*a* may be collocated with the receiver component 610-*a* in a transceiver module.

Figure 8:
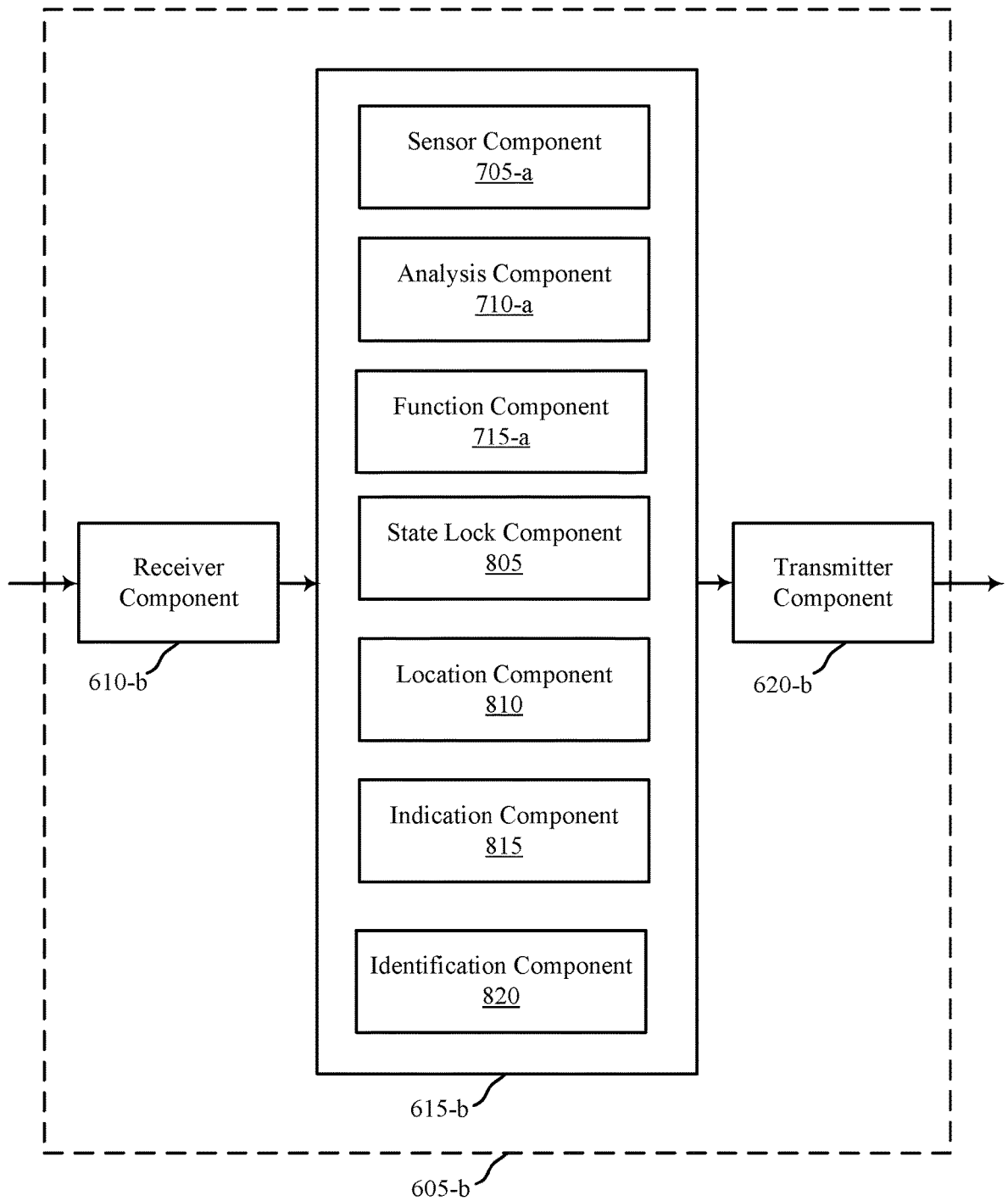
FIG. 8 shows a block diagram of an example apparatus relating to a security and automation system, in accordance with one or more examples of the present disclosure.

FIG. 8 shows a block diagram 800 of an example apparatus 605-*b* relating to a security and automation system, in accordance with one or more examples of the present disclosure. The apparatus 605-*b* may be an example of one or more examples of a control panel 135 described with reference to FIG. 1. The apparatus 605-*b* may be an example of one or more examples of a lock component 505 described with reference to FIGS. 5A-5C. The apparatus 605-*b* may include a receiver component 610-*b*, an automated door lock manager 615-*b*, and/or a transmitter component 620-*b*. The apparatus 605-*b* may also be or include a processor. In some examples, apparatus 605-*b* may be an example of one or more examples of apparatus 605 and apparatus 605-*a* described with reference to FIGS. 6 and 7. Each of these components or modules may be in communication with each other—directly and/or indirectly. In some examples, where apparatus 605-*b* is a control panel, apparatus 605-*b* may be a control panel in the form of an interactive home automation system display. In some examples, apparatus 605-*b* may be a local computing device 120 such as a personal computer or portable electronic device (e.g., smart phone, smart watch, tablet computer). In some examples, apparatus 605-*b* may be coupled to at least one sensor unit 110.

In some examples, the automated door lock manager 615-*b*, may include a sensor component 705-*a*, an analysis component 710-*a*, a function component 715-*a*, a state lock component 805, a location component 810, an indication component 815, and an identification component 820.

In some examples, the automated door lock manager 615-*b* may be an examples of one or more examples of automated door lock manager 615 and automated door lock manager 615-*a* described with reference to FIGS. 6 and 7.

The components of the apparatus 605-*b* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver component 610-*b* may receive information such as packets, user data, and/or control information associated with various information channels (e.g., control channels, data channels, etc.). In some examples, the receiver component 610-*b* may be configured to receive instructions at the apparatus 605-*b*. In one example, the receiver component 610-*b* may be configured to receive an instruction from local computing device 120 and/or remote computing device 140. In some examples, the received instruction may be in the form of a verbal command and/or a tactile input. In further examples, the receiver component 610-*b* may receive identification information, location information and/or authentication credentials from the sensor units 110, local computing device 120, remote computing device 140, and/or server 155. In some examples, information (e.g., authentication credentials, location information) may be passed on to the automated door lock manager 615-*b*, and to other components of the apparatus 605-*b*.

In some examples, the sensor component 705-*a* may identify an event associated with an access point of the structure based on the sensor data. In some examples, the sensor data comprises data received from: a sensor in contact with an access point, a sensor in or in contact with a doorbell camera, a sensor associated with an exterior of the structure, a sensor within the structure, a camera, a motion sensor, a control panel, or a combination thereof. In some examples, the sensor data may sensor data is associated with a lock component at an access point, wherein analyzing the received sensor data comprises determining that the sensor data indicates a person has interacted with an interior side of the lock at the access point. In some examples, the sensor component 705-*a* may determine that that the identified person passed through the access point based on the received sensor data. In some examples, the sensor component 705-*a* may determine that the sensor data indicates a location of the person relative to the access point. In some examples, the sensor component 705-*a* may determine that the sensor data indicates a location of the person relative to the access point. In some examples, the analysis component 710-*a* may determine that the event is an exit event associated with a person of the structure.

In some examples, the function component 715-*a* may adjust the state of the lock component is based on the exit event. In some examples, the function component 715-*a* may initiate the function autonomous of a user input received at a control panel, a doorbell camera, and/or a lock at an access point. In some examples, the function component 715-*a* may suspend an alarm event based on determining that the sensor data indicates the person has interacted with the interior side of the lock component at the access point.

In some examples, the function component 715-*a* may notify the person regarding a state of the lock component at the access point. In some examples, the function component 715-*a* may notify the person before the state of the lock component is modified based on an interaction with the interior side of the lock at the access point. In some examples, the function component 715-*a* may notify the person after the state of the lock component is modified and before an alarm event is triggered based on an interaction with the interior side of the lock component at the access point. In some examples, the function component 715-*a* may determine that the sensor data indicates a location of the person relative to the access point. In some examples, the function component 715-*a* may broadcast a message regarding a state of a lock component associated with the access point, or an alarm condition associated with the security and/or automation system, or a combination thereof.

In some examples, the state lock component 805 may identify a state of the access point after the identified person passed through the access point. In some examples, the state lock component 805 may determine a state of a lock component of the access point based on the event. In some examples, the state lock component 805 may modify the state of the lock component based the identified event. In some examples, the state lock component 805 may lock a lock component associated with one or more access points based on determining that the identified person passed through the access point and identifying the state the of the access point. In some examples, the state lock component 805 may adjust a state of a lock component associated with a second access point based on the sensor data. In some examples, the state lock component 805 may adjust a lock state of a plurality of locks each associated with one of a plurality of access points. In some examples, location component 810 may determine that that the sensor data indicates a location of the person relative to the access point.

In some examples, indication component 815 may visually indicate a state of a lock component associated with the access point, or an alarm condition associated with the security and/or automation system, or a combination thereof. In some examples, identification component 820 may determine an identity of a person at an access point based on analyzing the received sensor data.

The transmitter component 620-b may transmit the one or more signals received from other components of the apparatus 605-b. The transmitter component 620-b may transmit information collected by sensors such as actions or behaviors, times of entry or exits associated with a structure and/or a property, and the like. In some examples, the transmitter component 620-b may be collocated with the receiver component 610-b in a transceiver module.

Figure 9:
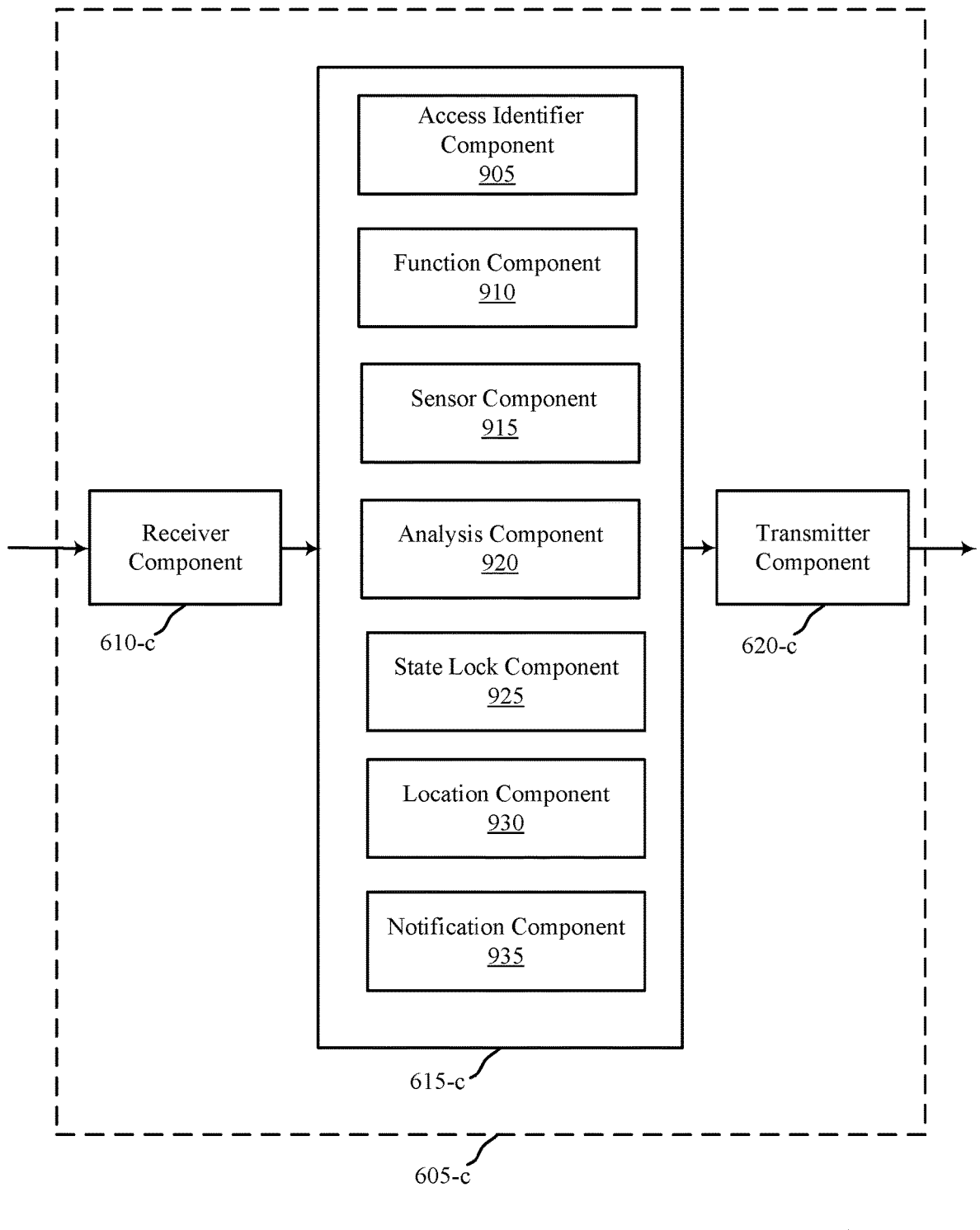
FIG. 9 shows a block diagram of an example apparatus relating to a security and automation system, in accordance with one or more examples of the present disclosure.

FIG. 9 shows a block diagram 900 of an example apparatus 605-c relating to a security and automation system, in accordance with one or more examples of the present disclosure. The apparatus 605-c may be an example of one or more examples of a control panel 135 described with reference to FIG. 1. The apparatus 605-c may be an example of one or more examples of a lock component 505 described with reference to FIGS. 5A-5C. The apparatus 605-c may include a receiver component 610-c, an automated door lock manager 615-c, and/or a transmitter component 620-c. The apparatus 605-c may also be or include a processor. In some examples, apparatus 605-c may be an example of one or more examples of apparatus 605, 605-a, and 605-b described with reference to FIGS. 6-8. Each of these components or modules may be in communication with each other—directly and/or indirectly.

In some examples, where apparatus 605-c is a control panel, apparatus 605-c may be a control panel in the form of an interactive home automation system display. In some examples, apparatus 605-c may be a local computing device 120 such as a personal computer or portable electronic device (e.g., smart phone, smart watch, tablet computer).

In some examples, the automated door lock manager 615-c, may include an access identifier component 905, a function component 910, a sensor component 915, an analysis component 920, a state lock component 925, a location component 930, and a notification component 935. In some examples, the automated door lock manager 615-c may be an examples of one or more examples of automated door lock manager 615, 615-a, and 615-b described with reference to FIGS. 6-8. The components of the apparatus 605-c may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver component 610-c may receive information such as packets, user data, and/or control information associated with various information channels (e.g., control channels, data channels, etc.). In some examples, the receiver component 610-c may be configured to receive instructions at the apparatus 605-c. In one example, the receiver component 610-c may be configured to receive an instruction from local computing device 120 and/or remote computing device 140. In some examples, the received instruction may be in the form of a verbal command and/or a tactile input. In further examples, the receiver component 610-c may receive identification information, location information and/or authentication credentials from the sensor units 110, local computing device 120, remote computing device 140, and/or server 155. In some examples, information (e.g., authentication credentials, location information) may be passed on to the automated door lock manager 615-c, and to other components of the apparatus 605-c.

In some examples, the access identifier component 905 may receive an access identifier at an access point. In some examples, the function component 910 may initiate a home automation function based on the received access identifier.

In some examples, the sensor component 915 may identify sensor data associated with a sensor. In some examples, the sensor component 915 may capture data at the access point based on receiving the access identifier. In some examples, the sensor component 915 may capture data at a location inside within a predetermined distance of the access point based on receiving the access identifier. In some examples, the sensor component 915 may capture data at a location inside a structure based on receiving the access identifier and sensor data indicating a person at the location.

In some examples, the analysis component 920 may analyze the identified sensor data. In some examples, the state lock component 925 may adjust a lock state associated with one or more access points based on the received access identifier, or an identity of a person in proximity to the access point, or a combination thereof.

In some examples, the location component 930 may identify an arrival of a person at the access point based on adjusting the lock state. In some examples, the location component 930 may identify an exit of the person at the access point based on the sensor data.

In some examples, the notification component 935 may notify an occupant based on the identified arrival, or the identified exit, or both. In some examples, the notification component 935 may notify the occupant regarding a status of the access identifier. In some examples, the notification component 935 may notify, at the access point, the person regarding a status of the access identifier.

The transmitter component 620-c may transmit the one or more signals received from other components of the apparatus 605-c. The transmitter component 620-c may transmit information collected by sensors such as actions or behaviors, times of entry or exits associated with a structure and/or a property, and the like. In some examples, the transmitter component 620-c may be collocated with the receiver component 610-c in a transceiver module.

Figure 10:
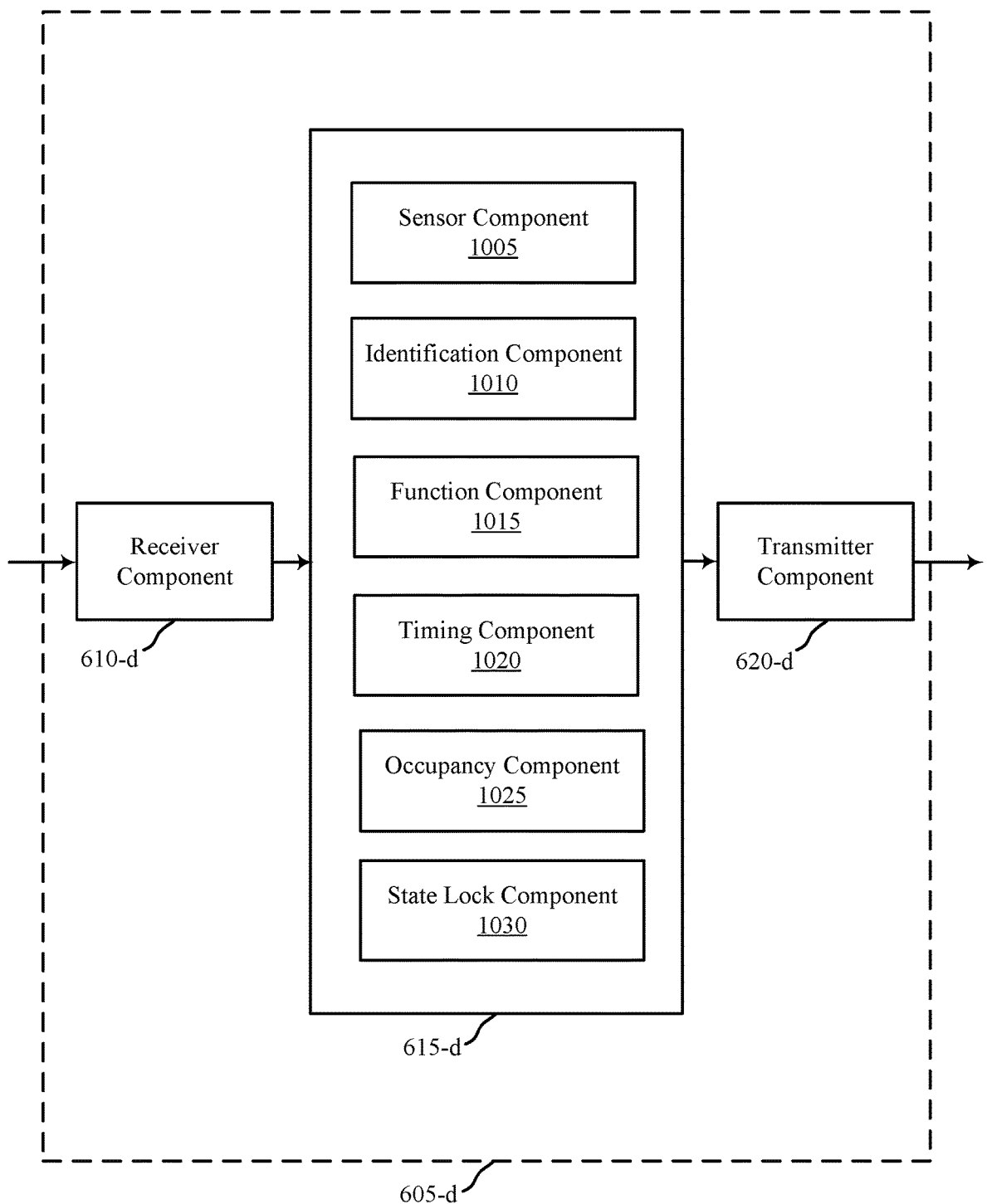
FIG. 10 shows a block diagram of an example apparatus relating to a security and automation system in accordance with one or more examples of the present disclosure.

FIG. 10 shows a block diagram 1000 of an example apparatus 605-d relating to a security and automation system, in accordance with one or more examples of the present disclosure. The apparatus 605-d may be an example of one or more examples of a control panel 135 described with reference to FIG. 1. The apparatus 605-d may be an example of one or more examples of a lock component 505 described with reference to FIGS. 5A-5C. The apparatus 605-d may include a receiver component 610-d, an automated door lock manager 615-d, and/or a transmitter component 620-d. The apparatus 605-d may also be or include a processor. In some examples, apparatus 605-d may be an example of one or more examples of apparatus 605, 605-a, 605-b, and 605-c described with reference to FIGS. 6-9. Each of these components or modules may be in communication with each other—directly and/or indirectly. In some examples, where apparatus 605-d is a control panel, apparatus 605-d may be a control panel in the form of an interactive home automation system display. In some examples, apparatus 605-d may be a local computing device 120 such as a personal computer or portable electronic device (e.g., smart phone, smart watch, tablet computer).

In some examples, the automated door lock manager 615-d, may include a sensor component 1005, an identification component 1010, a function component 1015, a timing component 1020, an occupancy component 1025, and a state lock component 1030. In some examples, the automated door lock manager 615-c may be an examples of one or more examples of automated door lock manager 615, 615-a, 615-b, and 615-c described with reference to FIGS. 6-9.

The components of the apparatus 605-d may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver component 610-d may receive information such as packets, user data, and/or control information associated with various information channels (e.g., control channels, data channels, etc.). In some examples, the receiver component 610-d may be configured to receive instructions at the apparatus 605-d. In one example, the receiver component 610-d may be configured to receive an instruction from local computing device 120 and/or remote computing device 140. In some examples, the received instruction may be in the form of a verbal command and/or a tactile input. In further examples, the receiver component 610-d may receive identification information, location information and/or authentication credentials from the sensor units 110, local computing device 120, remote computing device 140, and/or server 155. In some examples, information (e.g., authentication credentials, location information) may be passed on to the automated door lock manager 615-d, and to other components of the apparatus 605-d.

In some examples, the sensor component 1005 may identify sensor data associated with a sensor. In some examples, the sensor may be associated with an access point. In some examples, identification component 1010 may determine an identity of a person based on the sensor data. In some examples, identification component 1010 may identify an object based on the sensor data.

In some examples, function component 1015 may automatically initiate a home automation function based on determining the identity of the person. In some examples, function component 1015 may automatically initiate a home automation function based on a time. In some examples, function component 1015 may automatically initiate the home automation function is based on the identified object. In some examples, function component 1015 may automatically initiate the home automation function is based on identifying the number of people detected at the access point. In some examples, function component 1015 may automatically initiate the home automation function comprises unlocking a lock associated with another access point. In some examples, automatically initiating the home automation function is performed independent of user input, or an access identifier, or both.

In some examples, timing component 1020 may identify a time associated with the sensor data. In some examples, occupancy component 1025 may identify a number of people detected at an access point based on the sensor data. In some examples, state lock component 1030 may unlock a lock associated with the access point.

The transmitter component 620-d may transmit the one or more signals received from other components of the apparatus 605-d. The transmitter component 620-d may transmit information collected by sensors such as actions or behaviors, times of entry or exits associated with a structure and/or a property, and the like. In some examples, the transmitter component 620-d may be collocated with the receiver component 610-d in a transceiver module.

Figure 11:
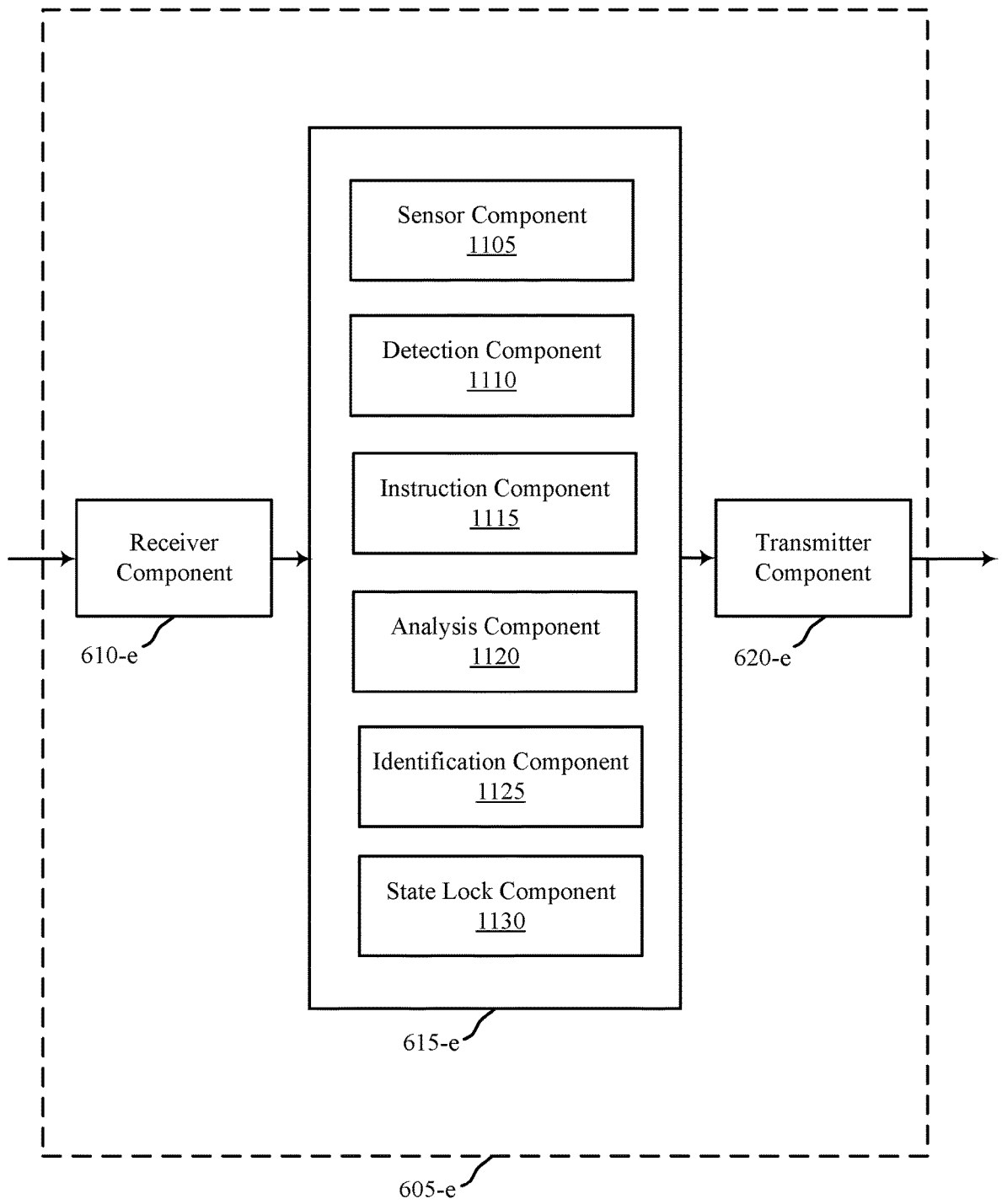
FIG. 11 shows a block diagram of an example apparatus relating to a security and automation system, in accordance with one or more examples of the present disclosure.

FIG. 11 shows a block diagram 1100 of an example apparatus 605-e relating to a security and automation system, in accordance with one or more examples of the present disclosure. The apparatus 605-e may be an example of one or more examples of a control panel 135 described with reference to FIG. 1. The apparatus 605-e may be an example of one or more examples of a lock component 505 described with reference to FIGS. 5A-5C. The apparatus 605-e may include a receiver component 610-e, an automated door lock manager 615-e, and/or a transmitter component 620-e. The apparatus 605-e may also be or include a processor. In some examples, apparatus 605-e may be an example of one or more examples of apparatus 605, 605-a, 605-b, 605-c, and 605-d described with reference to FIGS. 6-10. Each of these components or modules may be in communication with each other—directly and/or indirectly. In some examples, where apparatus 605-e is a control panel, apparatus 605-e may be a control panel in the form of an interactive home automation system display. In some examples, apparatus 605-e may be a local computing device 120 such as a personal computer or portable electronic device (e.g., smart phone, smart watch, tablet computer).

In some examples, the automated door lock manager 615-e, may include a sensor component 1105, a detection component 1110, an instruction component 1115, an analysis component 1120, an identification component 1125, and a state lock component 1130. In some examples, the automated door lock manager 615-e may be an examples of one or more examples of automated door lock manager 615, 615-*a*, 615-*b*, 615-*c*, and 615-*d* described with reference to FIGS. 6-10.

The components of the apparatus 605-*e* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver component 610-*e* may receive information such as packets, user data, and/or control information associated with various information channels (e.g., control channels, data channels, etc.). In some examples, the receiver component 610-*e* may be configured to receive instructions at the apparatus 605-*e*. In one example, the receiver component 610-*e* may be configured to receive an instruction from local computing device 120 and/or remote computing device 140. In some examples, the received instruction may be in the form of a verbal command and/or a tactile input. In further examples, the receiver component 610-*e* may receive identification information, location information and/or authentication credentials from the sensor units 110, local computing device 120, remote computing device 140, and/or server 155. In some examples, information (e.g., authentication credentials, location information) may be passed on to the automated door lock manager 615-*e*, and to other components of the apparatus 605-*e*.

In some examples, the sensor component 1105 may receive data associated with a delivery of a package to a structure. The sensor component 1105 may also capture an image or video of the delivery person at the access point. In some examples, the sensor component 1105 may capture an image or video of the delivery person placing the package in a delivery area of the structure. The sensor component 1105 may also transmit the captured image or video to a remote device. The data may include at least one of a delivery company name, delivery person information, a unique code associated with the delivery person, scheduled date of delivery, an expected time of the delivery, tracking number, number of packages, weight of each package, dimensions of each package, or a combination thereof. In some examples, the detection component 1110 may detect a delivery person arriving at an access point of the structure.

In some examples, the instruction component 1115 may provide instructions to the delivery person based on the detecting. In some examples, the instruction component 1115 may transmit an instruction to the lock component to change the lock state of the lock component based on the identity of the delivery person. In some examples, the instruction component 1115 may transmit an instruction to the another lock component associated with the another access point to change the unlock state to a lock state.

In some examples, the analysis component 1120 may analyze the image or video based on the capturing. In some examples, the identification component 1125 may determine an identity of the delivery person. In some examples, the state lock component 1130 may determine that the lock component associated with the access point is in a lock state. In some examples, the state lock component 1130 may determine an unlock state of another lock component associated with another access point of the structure.

The transmitter component 620-*e* may transmit the one or more signals received from other components of the apparatus 605-*e*. The transmitter component 620-*e* may transmit information collected by sensors such as actions or behaviors, times of entry or exits associated with a structure and/or a property, and the like. In some examples, the transmitter component 620-*e* may be collocated with the receiver component 610-*e* in a transceiver module.

Figure 12:
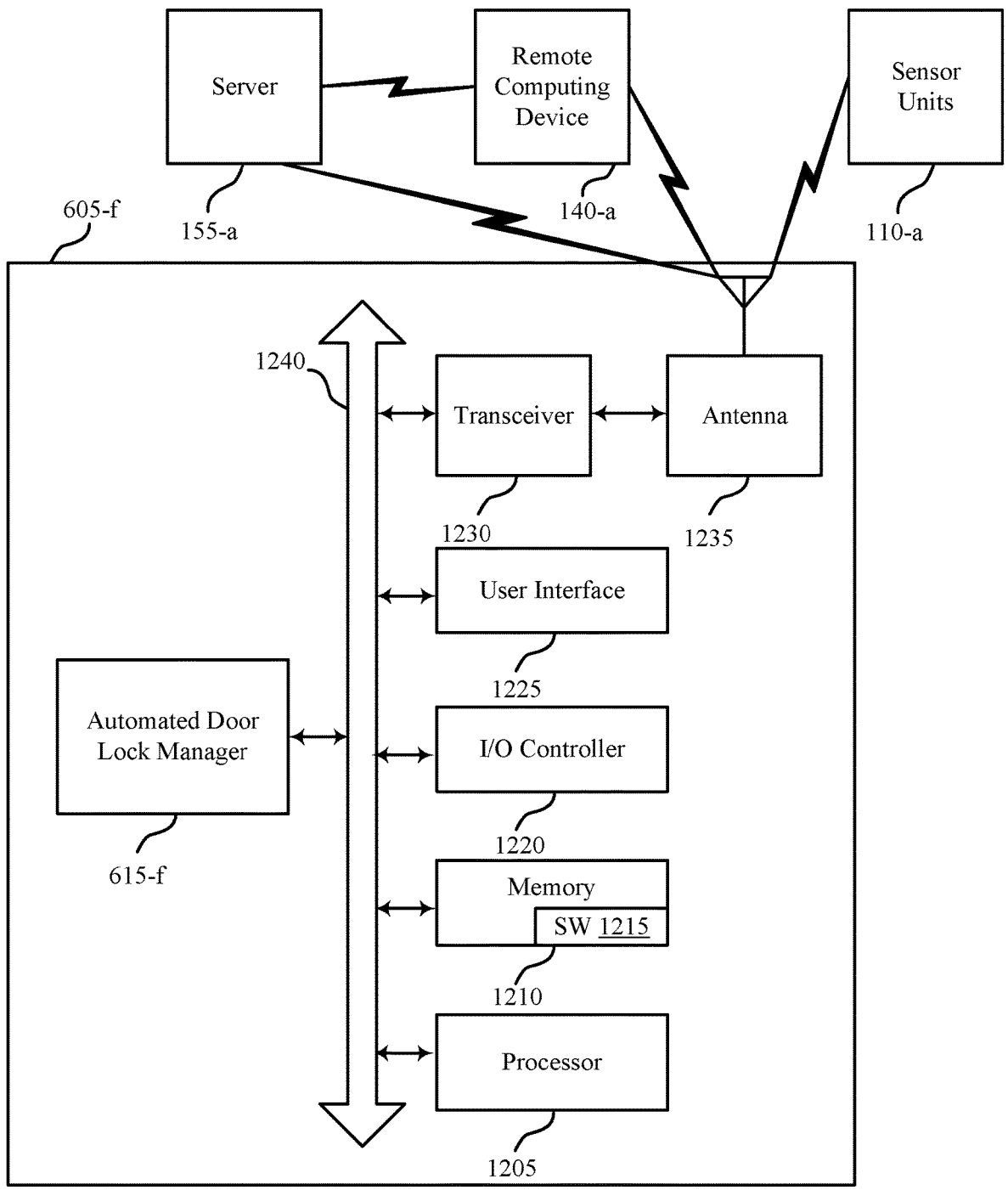
FIG. 12 shows a block diagram of an apparatus relating to a security and automation system, in accordance with one or more examples of the present disclosure.

FIG. 12 shows a block diagram 1200 of an apparatus 605-*f* relating to a security and automation system, in accordance with one or more examples of the present disclosure. Apparatus 605-*f* may be an example of the control panel 135, local computing device 120, and/or the sensor units 110 of FIG. 1. In some examples, apparatus 605-*f* may also be an example of one or more examples of apparatus 605, 605-*a*, 605-*b*, 605-*c*, 605-*d*, and/or 605-*e* with reference to FIGS. 6-11. The apparatus 605-*e* may be an example of one or more examples of a lock component 505 described with reference to FIGS. 5A-5C. Apparatus 605-*f* may include an automated door lock manager 605-*f*, which may be an example of the automated door lock manager 615, 615-*a*, 615-*b*, 615-*c*, 615-*d*, and/or 615-*e* with reference to FIGS. 6-11. The automated door lock manager 615-*f* may provide techniques for that support automatic door lock management associated with a security and automation system, as described above with reference to FIGS. 1-4.

Apparatus 605-*f* may also include components for bi-directional data communications including components for transmitting communications and components for receiving communications. For example, apparatus 605-*f* may communicate bi-directionally with remote computing device 140-*a*, server 155-*a*, or sensor units 110-*a*. This bi-directional communication may be direct (e.g., apparatus 605-*f* communicating directly with sensor units 110-*a* or remote computing device 140-*a*) or indirect (e.g., apparatus 605-*f* communicating with remote computing device 140-*a* via server 155-*a*). Server 155-*a*, remote computing device 140-*a*, and sensor units 110-*a* may be examples of server 155, remote computing device 140, and sensor units 110 as shown with respect to FIG. 1.

Apparatus 605-*f* may also include a processor 1205, and memory 1210 (including software (SW) 1215), an input/output (I/O) controller 1220, a user interface 1225, a transceiver 1230, and one or more antennas 1235, each of which may communicate—directly or indirectly—with one another (e.g., via one or more buses 1240). The transceiver 1230 may communicate bi-directionally—via the one or more antennas 1235, wired links, and/or wireless links—with one or more networks or remote devices as described above. For example, the transceiver 1230 may communicate bi-directionally with one or more of server 155-*a* or sensor unit 110-*a*. The transceiver 1230 may include a modem to modulate the packets and provide the modulated packets to the one or more antennas 1235 for transmission, and to demodulate packets received from the one or more antennas 1235. While an apparatus 605-*f* may include a single antenna 1235, the apparatus may also have multiple antennas 1235 capable of concurrently transmitting or receiving multiple wired and/or wireless transmissions. In some examples, one element of apparatus 605-*f* (e.g., one or more antennas 1235, transceiver 1230, etc.) may provide a direct connection to a server 155-*a* via a direct network link to the Internet via a POP (point of presence). In some examples, one element of apparatus 605-*f* (e.g., one or more antennas 1235, transceiver 1230, etc.) may provide a connection using wireless techniques, including digital cellular telephone connection, Cellular Digital Packet Data (CDPD) connection, digital satellite data connection, and/or another connection.

The signals associated with apparatus 605-*f*, server 155-*a*, remote computing device 140-*a*, and/or sensor unit 110-*a* may include wireless communication signals such as radio frequency, electromagnetics, local area network (LAN), wide area network (WAN), virtual private network (VPN), wireless network (using 802.11, for example), 345 MHz, Z Wave, cellular network (using 3G and/or LTE, for example), and/or other signals. The one or more antennas 1235 and/or transceiver 1230 may include or be related to, but are not limited to, wireless wide area network (WWAN) (GSM, CDMA, and WCDMA), WLAN (including Bluetooth and Wi-Fi), WMAN (WiMAX), antennas for mobile communications, antennas for Wireless Personal Area Network (WPAN) applications (including radio-frequency identification (RFID) and ultra-wideband (UWB)). In some examples, each antenna 1235 may receive signals or information specific and/or exclusive to itself. In other examples each antenna 1235 may receive signals or information neither specific nor exclusive to itself.

In some examples, the user interface 1225 may include an audio device, such as an external speaker system, a visual device such as a camera or video camera, an external display device such as a display screen, and/or an input device (e.g., remote control device interfaced with the user interface 1225 directly and/or through I/O controller 1220). In some examples, one or more buses 1240 may allow data communication between one or more elements of apparatus 605-*f* (e.g., processor 1205, memory 1210, I/O controller 1220, user interface 1225, etc.).

The memory 1210 may include random access memory (RAM), read only memory (ROM), flash RAM, and/or other types. The memory 1210 may store computer-readable, computer-executable software/firmware code 1215 including instructions that, when executed, cause the processor 1205 to perform various functions described in this disclosure (e.g., analyzing the authentication credentials, transmitting a message to a remote device, etc.). Alternatively, the computer-executable software/firmware code 1215 may not be directly executable by the processor 1205 but may cause a computer (e.g., when compiled and executed) to perform functions described herein.

In some examples the processor 1205 may include, among other things, an intelligent hardware device (e.g., a central processing unit (CPU), a microcontroller, and/or an ASIC, etc.). The memory 1210 may contain, among other things, the Basic Input-Output system (BIOS) which may control basic hardware and/or software operation such as the interaction with peripheral components or devices. For example, the automated door lock manager 615-*f* may be stored within the memory 1210. Applications resident with apparatus 605-*f* are generally stored on and accessed via a non-transitory computer readable medium, such as a hard disk drive or other storage medium. Additionally, applications may be in the form of electronic signals modulated in accordance with the application and data communication technology when accessed via a network interface (e.g., transceiver 1230, one or more antennas 1235, etc.).

Many other devices and/or subsystems may be connected to, or may be included as, one or more elements of apparatus 605-*f* (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some examples, all of the elements shown in FIG. 12 need not be present to practice the present systems and methods. The devices and subsystems can be interconnected in different ways from that shown in FIG. 12. In some examples, an example of some operation of a system, such as that shown in FIG. 12, may be readily known in the art and is not discussed in detail in this disclosure. Code to implement the present disclosure may be stored in a non-transitory computer-readable medium such as one or more of memory 1210 or other memory. The operating system provided on I/O controller 1220 may be iOS®, ANDROID®, MS-dOS®, MS-WINDOWS®, OS/2®, UNIX®, LINUX®, or another known operating system.

The components of the apparatus 605-*f* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

Figure 13:
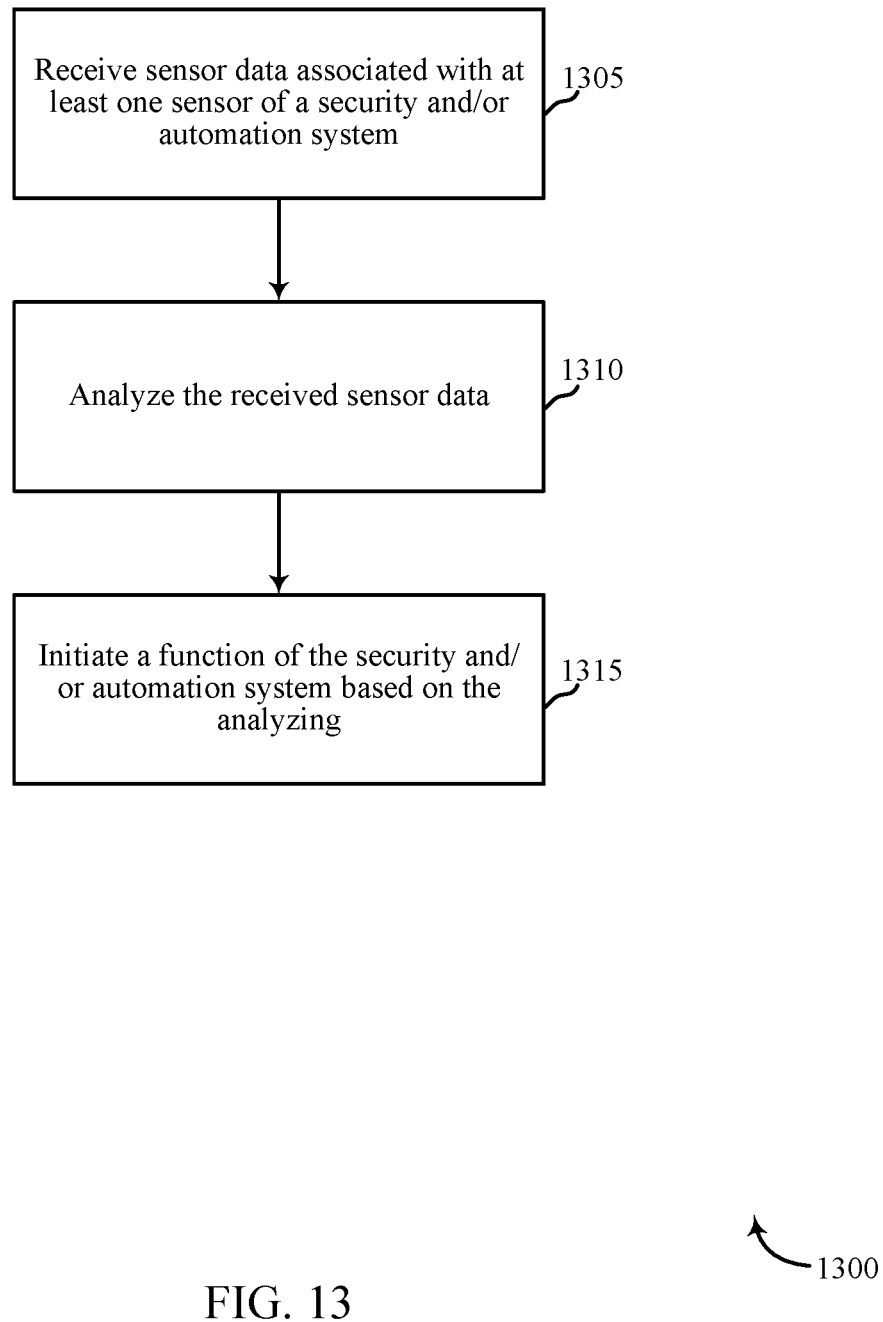
FIG. 13 is a flow chart illustrating an example of a method relating to a security and/or an automation system, in accordance with one or more examples of the present disclosure.

FIG. 13 is a flow chart illustrating an example of a method 1300 relating to a security and/or an automation system, in accordance with one or more examples of the present disclosure. For clarity, the method 1300 is described below with reference to examples of one or more of the sensor units 110, local computing device 120, control panel 135, and/or remote computing device 140 as described with reference to at least FIG. 1. In addition, method 1300 is described below with reference to examples of one or more of the apparatus 605, 605-*a*, 605-*b*, 605-*c*, 605-*d*, 605-*e*, or 605-*f* described with reference to at least FIGS. 6-12. The apparatus 605-*e* may be an example of one or more examples of a lock component 505 described with reference to FIGS. 5A-5C. In some examples, control panel 135, local computing device 120, and/or sensor units 110 may execute one or more sets of codes to control the functional elements described below. Additionally or alternatively, the control panel 135, local computing device 120, and/or sensor units 110 may perform one or more of the functions described below using special-purpose hardware.

At block 1305, the method 1300 may include receiving sensor data associated with at least one sensor of a security and/or automation system. The operation at block 1305 may be performed using the automated door lock manager 615, control panel 135, sensor units 110, or apparatus 605, described with reference to FIGS. 1 and 6-12. In some examples, the operation at block 1305 may be performed, additionally or alternatively, using the sensor component as described with reference to FIGS. 7 and 8.

At block 1310, the method 1300 may include analyzing the received sensor data. The operation at block 1310 may be performed using the automated door lock manager 615, control panel 135, sensor units 110, or apparatus 605, described with reference to FIGS. 1 and 6-12. In some examples, the operation at block 1305 may be performed, additionally or alternatively, using the analysis component as described with reference to FIGS. 7 and 8.

At block 1315, the method 1300 may include initiating a function of the security and/or automation system based on the analyzing. The operation at block 1315 may be performed using the automated door lock manager 615, control panel 135, sensor units 110, or apparatus 605, described with reference to FIGS. 1 and 6-12. In some examples, the operation at block 1305 may be performed, additionally or alternatively, using the function component as described with reference to FIGS. 7 and 8.

Figure 14:
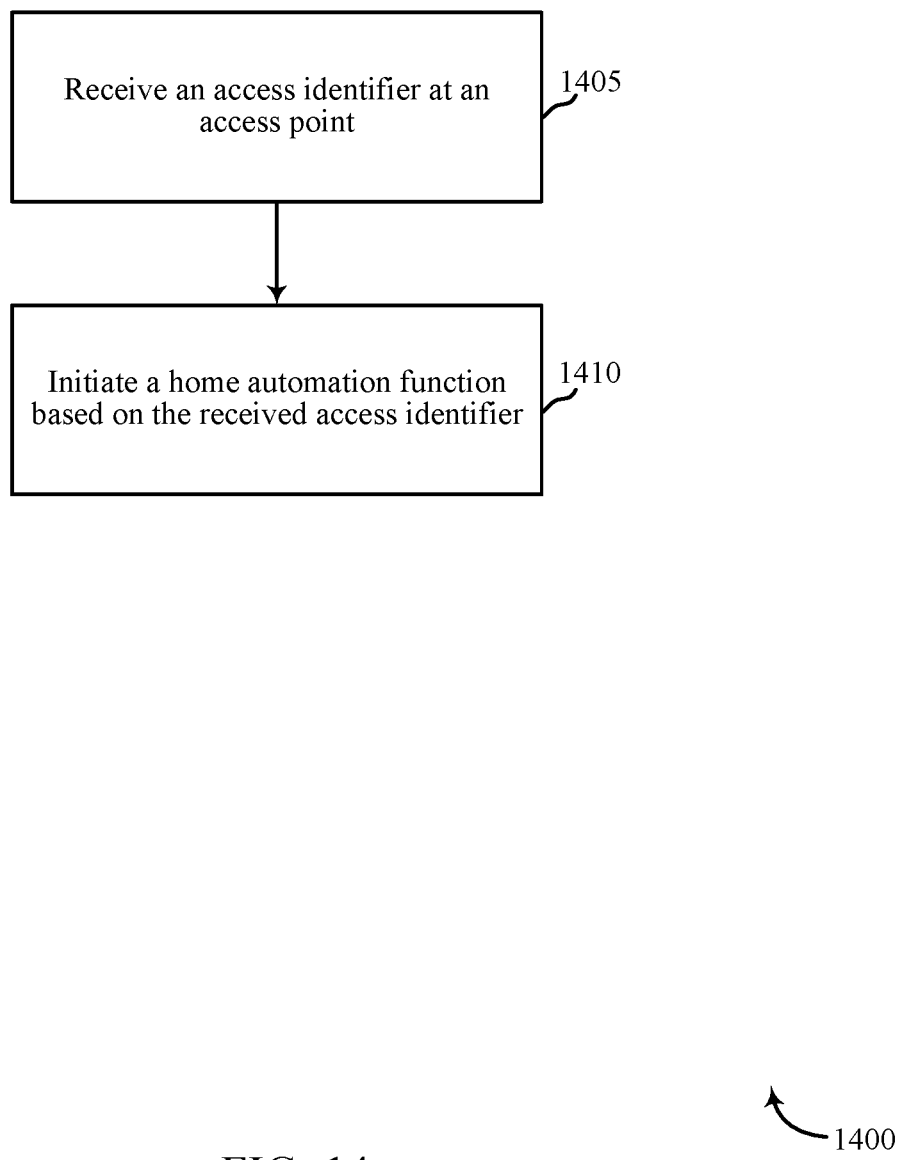
FIG. 14 is a flow chart illustrating an example of a method relating to a security and automation system, in accordance with one or more examples of the present disclosure.

FIG. 14 is a flow chart illustrating an example of a method 1400 relating to a security and/or an automation system, in accordance with one or more examples of the present disclosure. For clarity, the method 1400 is described below with reference to examples of one or more of the sensor units 110, local computing device 120, control panel 135, and/or remote computing device 140 as described with reference to at least FIG. 1. In addition, method 1400 is described below with reference to examples of one or more of the apparatus 605, 605-*a*, 605-*b*, 605-*c*, 605-*d*, 605-*e*, or 605-*f* described with reference to at least FIGS. 6-12. The apparatus 605-*e* may be an example of one or more examples of a lock component 505 described with reference to FIGS. 5A-5C. In some examples, control panel 135, local computing device 120, and/or sensor units 110 may execute one or more sets of codes to control the functional elements described below. Additionally or alternatively, the control panel 135, local computing device 120, and/or sensor units 110 may perform one or more of the functions described below using special-purpose hardware.

At block 1405, the method 1400 may include receiving an access identifier at an access point. The operation at block 1405 may be performed using the automated door lock manager 615, control panel 135, sensor units 110, or apparatus 605, described with reference to FIGS. 1 and 6-12. In some examples, the operation at block 1405 may be performed, additionally or alternatively, using the access identifier component as described with reference to FIG. 9.

At block 1410, the method 1400 may include initiating a home automation function based on the received access identifier. The operation at block 1410 may be performed using the automated door lock manager 615, control panel 135, sensor units 110, or apparatus 605, described with reference to FIGS. 1 and 6-12. In some examples, the operation at block 1410 may be performed, additionally or alternatively, using the function component as described with reference to FIG. 9.

Figure 15:
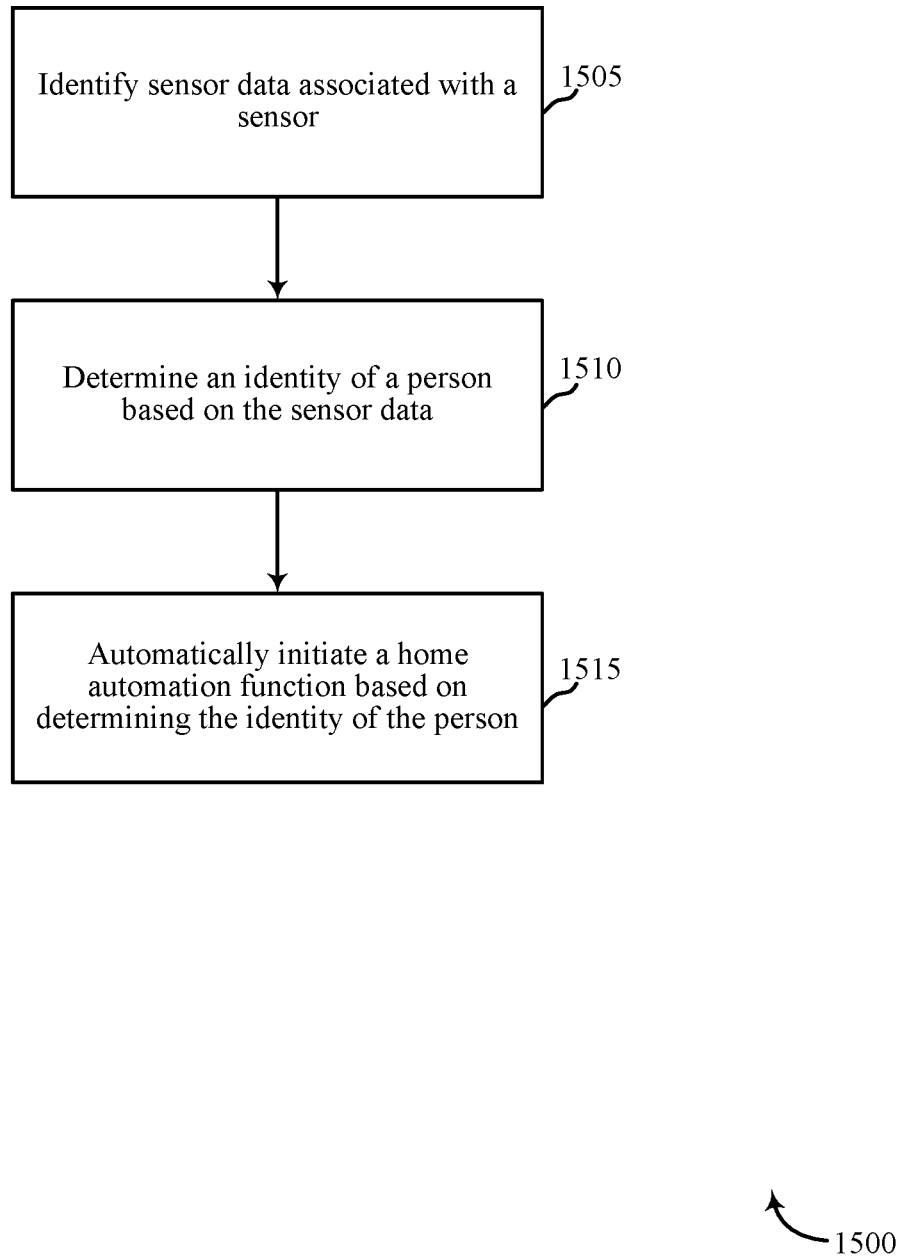
FIG. 15 is a flow chart illustrating an example of a method relating to a security and automation system, in accordance with one or more examples of the present disclosure.

FIG. 15 is a flow chart illustrating an example of a method 1500 relating to a security and/or an automation system, in accordance with one or more examples of the present disclosure. For clarity, the method 1500 is described below with reference to examples of one or more of the sensor units 110, local computing device 120, control panel 135, and/or remote computing device 140 as described with reference to at least FIG. 1. In addition, method 1500 is described below with reference to examples of one or more of the apparatus 605, 605-*a*, 605-*b*, 605-*c*, 605-*d*, 605-*e*, or 605-*f* described with reference to at least FIGS. 6-12. The apparatus 605-*e* may be an example of one or more examples of a lock component 505 described with reference to FIGS. 5A-5C. In some examples, control panel 135, local computing device 120, and/or sensor units 110 may execute one or more sets of codes to control the functional elements described below. Additionally or alternatively, the control panel 135, local computing device 120, and/or sensor units 110 may perform one or more of the functions described below using special-purpose hardware.

At block 1505, the method 1500 may include identifying sensor data associated with a sensor. The operation at block 1505 may be performed using the automated door lock manager 615, control panel 135, sensor units 110, or apparatus 605, described with reference to FIGS. 1 and 6-12. In some examples, the operation at block 1505 may be performed, additionally or alternatively, using the sensor component as described with reference to FIG. 10.

At block 1510, the method 1500 may include determining an identity of a person based on the sensor data. The operation at block 1510 may be performed using the automated door lock manager 615, control panel 135, sensor units 110, or apparatus 605, described with reference to FIGS. 1 and 6-12. In some examples, the operation at block 1510 may be performed, additionally or alternatively, using the identification component as described with reference to FIG. 10.

At block 1515, the method 1500 may include automatically initiating a home automation function based on determining the identity of the person. The operation at block 1515 may be performed using the automated door lock manager 615, control panel 135, sensor units 110, or apparatus 605, described with reference to FIGS. 1 and 6-12. In some examples, the operation at block 1515 may be performed, additionally or alternatively, using the function component as described with reference to FIG. 10.

Figure 16:
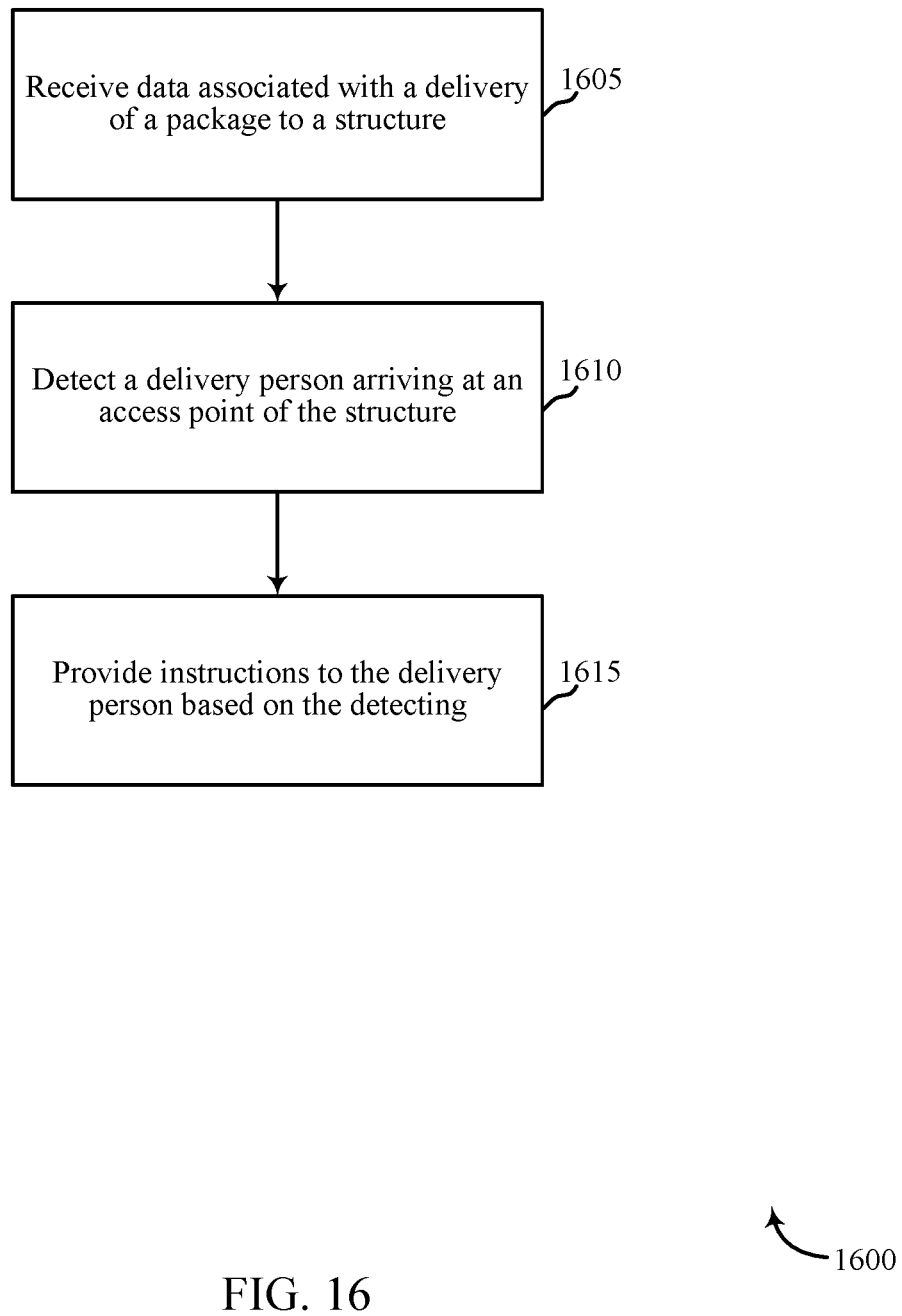
FIG. 16 is a flow chart illustrating an example of a method relating to a security and automation system, in accordance with one or more examples of the present disclosure.

FIG. 16 is a flow chart illustrating an example of a method 1600 relating to a security and/or an automation system, in accordance with one or more examples of the present disclosure. For clarity, the method 1600 is described below with reference to examples of one or more of the sensor units 110, local computing device 120, control panel 135, and/or remote computing device 140 as described with reference to at least FIG. 1. In addition, method 1600 is described below with reference to examples of one or more of the apparatus 605, 605-*a*, 605-*b*, 605-*c*, 605-*d*, 605-*e*, or 605-*f* described with reference to at least FIGS. 6-12. The apparatus 605-*e* may be an example of one or more examples of a lock component 505 described with reference to FIGS. 5A-5C. In some examples, control panel 135, local computing device 120, and/or sensor units 110 may execute one or more sets of codes to control the functional elements described below. Additionally or alternatively, the control panel 135, local computing device 120, and/or sensor units 110 may perform one or more of the functions described below using special-purpose hardware.

At block 1605, the method 1600 may include receiving data associated with a delivery of a package to the structure. The operation at block 1605 may be performed using the automated door lock manager 615, control panel 135, sensor units 110, or apparatus 605, described with reference to FIGS. 1 and 6-12. In some examples, the operation at block 1605 may be performed, additionally or alternatively, using the sensor component as described with reference to FIG. 11.

At block 1610, the method 1600 may include detecting a delivery person arriving at an access point of the structure. The operation at block 1610 may be performed using the automated door lock manager 615, control panel 135, sensor units 110, or apparatus 605, described with reference to FIGS. 1 and 6-12. In some examples, the operation at block 1610 may be performed, additionally or alternatively, using the detection component as described with reference to FIG. 11.

At block 1615, the method 1600 may include providing instructions to the delivery person based on the detecting. The operation at block 1615 may be performed using the automated door lock manager 615, control panel 135, sensor units 110, or apparatus 605, described with reference to FIGS. 1 and 6-12. In some examples, the operation at block 1615 may be performed, additionally or alternatively, using the instruction component as described with reference to FIG. 11.

In some examples, examples from two or more of the methods 1300, 1400, 1500, and 1600 may be combined and/or separated. It should be noted that the methods 1300, 1400, 1500, and 1600 are just example implementations, and that the operations of the methods 1300, 1400, 1500, and 1600 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some examples, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various examples have been described and/or illustrated here in the context of fully functional computing systems, one or more of these exemplary examples may be distributed as a program product in a variety of forms, regardless of the particular type of computer-readable media used to actually carry out the distribution. The examples disclosed herein may also be implemented using software modules that perform certain tasks. These software modules may include script, batch, or other executable files that may be stored on a computer-readable storage medium or in a computing system. In some examples, these software modules may permit and/or instruct a computing system to perform one or more of the exemplary examples disclosed here.

This description, for purposes of explanation, has been described with reference to specific examples. The illustrative discussions above, however, are not intended to be exhaustive or limit the present systems and methods to the precise forms discussed. Many modifications and variations are possible in view of the above teachings. The examples were chosen and described in order to explain the principles of the present systems and methods and their practical applications, to enable others skilled in the art to utilize the present systems, apparatus, and methods and various examples with various modifications as may be suited to the particular use contemplated.

What is claimed is:

1. A method for a security and automation system, comprising:
   receiving data associated with a delivery of a package to a structure;
   detecting a delivery person arriving at an access point of the structure;
   determining an identity of the delivery person based at least in part on bioinformation of the delivery person;
   determining a number of zones inside the structure, wherein each zone comprises a security setting and a barrier having a lock mechanism;
   determining that a first zone of the number of zones is occupied based at least in part on sensor data;
   securing the first zone based at least in part on the first zone being occupied;
   determining that the second zone comprises a delivery zone for the delivery of the package based at least in part on the first zone being occupied;
   unsecuring the second zone based at least in part on determining that the second zone comprises the delivery zone; and
   performing a function of the security and automation system based at least in part on the identity of the delivery person and the second zone comprising the delivery zone, the function comprising providing, to the delivery person, instructions on a placement of the package within the delivery zone.

2. The method of claim 1, further comprising:
   determining that a lock mechanism associated with the access point is in a first state, wherein the access point is associated with the delivery zone; and
   transmitting an instruction, to a lock mechanism of a barrier associated with the access point, to change from the first state to a second state based at least in part on the identity of the delivery person and a security setting of the delivery zone.

3. The method of claim 2, further comprising:
   determining an occupancy of the structure based at least in part on the sensor data;
   identifying a zone of the number of zones associated with the determined occupancy; and
   securing the zone based at least in part on the determined occupancy.

4. The method of claim 3, wherein securing the zone further comprises:
   determining that a lock mechanism associated with an access point to the identified zone is in the second state; and
   transmitting an instruction, to the lock mechanism associated with the access point to the identified zone, to change from the second state to the first state.

5. The method of claim 2, wherein the first state is a lock state and the second state is an unlock state.

6. The method of claim 1, further comprising:
   capturing, at the access point, an image or video of the delivery person;
   analyzing the image or video based at least in part on the capturing; and
   determining the identity of the delivery person based at least in part on the analyzing.

7. The method of claim 6, wherein analyzing the image or video further comprises:
   performing an image or video analytics operation on the image or the video; and
   identifying an object in the image or the video based at least in part on the image or video analytics and an image or video database, wherein the image or video database comprises a plurality of profiles of individuals.

8. The method of claim 7, wherein determining the identity of the delivery person further comprises:
   comparing the identified object to each profile of the plurality of profiles of the individuals; and
   determining a match between the identified object and at least one profile of the plurality of profiles, wherein the identity of the delivery person is based at least in part on the match.

9. The method of claim 1, further comprising:
   providing instructions to the delivery person based at least in part on the detecting, wherein the instructions comprises an audio, or a video, or a written message.

10. The method of claim 1, further comprising:
    capturing an image or video of the delivery person placing the package in the delivery zone; and
    transmitting the captured image or video to a remote device.

11. The method of claim 1, wherein the data comprises at least one of a delivery company name, delivery person information, a unique code associated with the delivery person, a scheduled date of delivery, an expected time of the delivery, a tracking number, a number of packages, a weight of each package, dimensions of each package, or a combination thereof.

12. An apparatus of a security and automation system, comprising:
    a processor;
    memory in electronic communication with the processor; and
    instructions stored in the memory and executable by the processor to cause the apparatus to:
      receive data associated with a delivery of a package to a structure;
      detect a delivery person arriving at an access point of the structure;

determine an identity of the delivery person based at least in part on bioinformation of the delivery person;

determine a number of zones inside the structure, wherein each zone comprises a security setting and a barrier having a lock mechanism;

determine that a first zone of the number of zones is occupied based at least in part on sensor data;

secure the first zone based at least in part on the first zone being occupied;

determine that the second zone comprises a delivery zone for the delivery of the package based at least in part on the first zone being occupied;

unsecure the second zone based at least in part on determining that the second zone comprises the delivery zone; and perform a function of the security and automation system based at least in part on the identity of the delivery person and the second zone comprising the delivery zone, the function comprising providing, to the delivery person, directions on a placement of the package within the delivery zone.

13. The apparatus of claim 12, wherein the instructions are further executable by the processor to:
determine that a lock mechanism associated with the access point is in a first state, wherein the access point is associated with the delivery zone; and
transmit an instruction, to a lock mechanism of a barrier associated with the access point, to change from the first state to a second state based at least in part on the identity of the delivery person and a security setting of the delivery zone.

14. The apparatus of claim 13, wherein the instructions are further executable by the processor to:
determine an occupancy of the structure based at least in part on the sensor data;
identify a zone of the number of zones associated with the determined occupancy; and
secure the zone based at least in part on the determined occupancy.

15. The apparatus of claim 14, wherein the instructions to secure the zone are further executable by the processor to:
determine that a lock mechanism associated with an access point to the identified zone is in the second state; and
transmit an instruction, to the lock mechanism associated with the access point to the identified zone, to change from the second state to the first state.

16. The apparatus of claim 13, wherein the first state is a lock state and the second state is an unlock state.

17. The apparatus of claim 12, wherein the instructions are further executable by the processor to:
capture, at the access point, an image or video of the delivery person;
analyze the image or video based at least in part on the capturing; and
determine the identity of the delivery person based at least in part on the analyzing.

18. The apparatus of claim 17, wherein the instructions to analyze the image or video are further executable by the processor to:
perform an image or video analytics operation on the image or the video; and
identify an object in the image or the video based at least in part on the image or video analytics and an image or video database, wherein the image or video database comprises a plurality of profiles of individuals.

19. The apparatus of claim 18, wherein the instructions to determine the identity the object are further executable by the processor to:
compare the identified object to each profile of the plurality of profiles of the individuals; and
determine a match between the identified object and at least one profile of the plurality of profiles, wherein the identity of the delivery person is based at least in part on the match.

20. A non-transitory computer-readable medium storing a program that, when executed by a processor, causes the processor to:
receive data associated with a delivery of a package to a structure;
detect a delivery person arriving at an access point of the structure;
determine an identity of the delivery person based at least in part on bioinformation of the delivery person;
determine a number of zones inside the structure, wherein each zone comprises a security setting and a barrier having a lock mechanism;
determine that a first zone of the number of zones is occupied based at least in part on sensor data;
secure the first zone based at least in part on the first zone being occupied;
determine that the second zone comprises a delivery zone for the delivery of the package based at least in part on the first zone being occupied;
unsecure the second zone based at least in part on determining that the second zone comprises the delivery zone; and
perform a function of the security and automation system based at least in part on the identity of the delivery person and the second zone comprising the delivery zone, the function comprising providing, to the delivery person, instructions on a placement of the package within the delivery zone.

\* \* \* \* \*